US010169065B1

(12) United States Patent
Nye et al.

(10) Patent No.: US 10,169,065 B1
(45) Date of Patent: Jan. 1, 2019

(54) LIVE MIGRATION OF HARDWARE ACCELERATED APPLICATIONS

(71) Applicant: Altera Corporation, San Jose, CA (US)

(72) Inventors: Jeffrey L. Nye, Austin, TX (US); Shiva Rao, Belmont, CA (US)

(73) Assignee: Altera Corporation, San Jose, AZ (US)

( * ) Notice: Subject to any disclaimer, the term of this patent is extended or adjusted under 35 U.S.C. 154(b) by 182 days.

(21) Appl. No.: 15/197,260

(22) Filed: Jun. 29, 2016

(51) Int. Cl.
| G06F 9/445 | (2018.01) |
| G06F 9/455 | (2018.01) |
| G06F 8/61 | (2018.01) |
| H04L 29/08 | (2006.01) |
| G06F 9/48 | (2006.01) |

(52) U.S. Cl.
CPC ............ G06F 9/45558 (2013.01); G06F 8/63 (2013.01); G06F 9/4856 (2013.01); H04L 67/1097 (2013.01); *G06F 2009/4557* (2013.01)

(58) Field of Classification Search
CPC ............... G06F 11/1662; G06F 11/203; G06F 9/45558; G06F 2009/4557; H04L 41/0813; H04L 67/14; H04L 63/045
See application file for complete search history.

(56) References Cited

U.S. PATENT DOCUMENTS

| 8,239,609 | B2 | 8/2012 | Hudzia |
| 8,281,013 | B2 | 10/2012 | Mundkur et al. |
| 8,370,560 | B2 | 2/2013 | Dow et al. |
| 8,429,651 | B2 | 4/2013 | Donnellan et al. |
| 8,578,377 | B2 | 11/2013 | Ge et al. |
| 8,671,238 | B2 | 3/2014 | Mashtizadeh et al. |
| 8,830,870 | B2 | 9/2014 | Cardona et al. |
| 9,811,367 | B2 * | 11/2017 | Rouwet ............... G06F 9/45558 |
| 2003/0033344 | A1 * | 2/2003 | Abbott ................. G06F 9/4435 |
| | | | 718/1 |

(Continued)

OTHER PUBLICATIONS

Stuart Byma et al., FPGAs in the Cloud: Booting Virtualized Hardware Accelerators with OpenStack, Field-Programmable Custom Computing Machines (FCCM), 2014 IEEE 22nd Annual International Symposium, May 11-13, 2014, 109-116, Boston, MA.

(Continued)

*Primary Examiner* — Tuan A Vu
(74) *Attorney, Agent, or Firm* — Treyz Law Group, P.C.; Vineet Dixit

(57) ABSTRACT

Live migration of a hardware accelerated application may be orchestrated by cloud services to transfer the application from a source server to a destination server. The live migration may be triggered by probe circuitry that monitors quality of service metrics for migration conditions at the source server. When live migration is initiated by the cloud services, a snapshot of all state information relevant to the application at the source server may be saved to network attached storage accessible by the destination server. Changes to said state information at the source server may be mirrored onto the network attached storage. The destination server may copy the snapshot and subsequent changes and run the application in parallel before taking complete control of the application. After a handshake operation between the source and destination servers, the application may be shut down at the source server.

19 Claims, 19 Drawing Sheets

(56) References Cited

U.S. PATENT DOCUMENTS

| | | | | |
|---|---|---|---|---|
| 2006/0161746 | A1* | 7/2006 | Wong | G06F 11/1662 |
| | | | | 711/162 |
| 2007/0033397 | A1* | 2/2007 | Phillips, II | H04L 63/045 |
| | | | | 713/168 |
| 2009/0113109 | A1* | 4/2009 | Nelson | G06F 11/203 |
| | | | | 711/6 |
| 2010/0070678 | A1* | 3/2010 | Zhang | G06F 9/461 |
| | | | | 711/6 |
| 2012/0303799 | A1* | 11/2012 | Hadas | G06F 9/4856 |
| | | | | 709/224 |
| 2013/0219043 | A1* | 8/2013 | Steiner | G06F 9/4856 |
| | | | | 709/224 |
| 2015/0019624 | A1* | 1/2015 | Jayakeerthy | H04L 67/14 |
| | | | | 709/203 |
| 2015/0271152 | A1* | 9/2015 | Lie | G06F 9/45558 |
| | | | | 713/165 |
| 2016/0139944 | A1* | 5/2016 | Rouwet | G06F 9/45558 |
| | | | | 718/1 |
| 2016/0212222 | A1* | 7/2016 | Bultema | H04L 41/0813 |
| 2017/0364387 | A1* | 12/2017 | Ahmed | G06F 9/4856 |

OTHER PUBLICATIONS

Stuart Byma et al., Virtualized FPGA accelerators in Cloud Computing Systems, November FPGA Seminar, Nov. 21, 2013.

* cited by examiner

LIVE MIGRATION OF HARDWARE ACCELERATED APPLICATIONS

BACKGROUND

This invention relates to a method for migrating an application with associated hardware accelerator resources between servers, while the application is running, and with minimal interruption to the operation of the application. Migration of a running application from one computing resource to another is referred to as live migration. In conventional live migration, user space applications or virtual machines may be migrated from general-purpose computing resources (such as CPU-based computing resources) of one computer to the general-purpose computing resources of another computer. However, conventional methods for migrating applications do not support the migration of applications that utilize hardware acceleration resources.

For computationally intensive tasks, computing resources with hardware acceleration capabilities are desirable. Current methods of migrating applications that use hardware accelerators require said applications to be disabled to allow server hardware to be changed during the downtime.

Computing methods in which cloud-based services are used to orchestrate processes on remote servers often benefit from being able to migrate applications from one computing resource to another. Migration in this context allows any given server that is running an application to have its resources freed up by migrating the application to another server. The ability to perform live migration can optimize the computing resource allocation for tasks that rely on multiple applications running on multiple servers.

A potential cost of live migration is application downtime during the migration process. During the transition of the application from one computing resource to another, there may be intervals during which the application is halted or paused, which can adversely affect the performance of a system that relies on said application. In computing systems that utilize hardware acceleration resources, but do not provide a means by which said hardware acceleration resources can be migrated along with the virtual machines they support, entire tasks within an application that are specific to the hardware acceleration resources may need to be restarted upon the migration of the virtual machines to new computing resources. Pausing, halting, or back-tracking an application in this way can adversely affect the performance of systems that rely on live migration of applications between different computing resources.

It would therefore be desirable to perform live migration of applications with hardware acceleration resources with reduced application downtime.

SUMMARY

Methods of live migration described herein in connection with embodiments of the present invention may relate to the live migration of hardware accelerated applications from a source server to a destination server. Cloud services, or more generally, network control services implemented on hardware coupled to one or more servers through a communications network may be used to orchestrate live migration of hardware accelerated applications.

To initiate live migration of a hardware accelerated application, cloud services may be notified of a migration condition on a source server running the hardware accelerated application. The migration condition may be detected by probe circuitry on the source server processor and/or programmable circuitry used to implement the hardware acceleration resources. Migration conditions may comprise a threshold number of performance criteria violations occurring, or prolonged intervals during which performance ranges are not met. Upon being notified of the migration condition, the network control services may issue migration notifications to the source server and to a destination server to which the hardware accelerated application will be migrated.

The source server may take a snapshot of state information for one or more applications running on the source server processor as well as state information for one or more hardware acceleration resources associated with the application to be migrated. The snapshot of state information associated with the application to be migrated may be saved to network attached storage accessible by the destination server. The destination server may install virtual machines, hardware accelerators, drivers, and/or applications associated with the application to be migrated based at least partly on the snapshot of the state information saved by the source server to the network attached storage.

The source server may continually mirror changes to the state information onto the image on the network attached storage, while the destination server copies said mirrored changes from the network attached storage. The destination server may then initiate the application to run in parallel with the source server until it is determined that the destination server is ready to take over the application completely. At any point prior to the application being shut down on the source server, the live migration operation can be halted without any noticeable degradation in performance to the end-user of the hardware accelerated application to be migrated.

A handshaking protocol may be used by the source and destination servers to establish conditions for complete transfer of the application to the destination server. After the handshaking protocol is completed, the network attached storage and source server may be made available for use to other applications.

DETAILED DESCRIPTION

Embodiments of the present invention relate to live migration of applications running on servers that employ CPU-based computing with hardware acceleration circuits that are recruited to perform tasks under the direction of the CPU and interface with the virtual machines. Certain applications may use virtual machines that use hardware acceleration circuits. The use of hardware acceleration circuits need not require an active or volitional recruitment of said hardware acceleration circuits under the direction of the CPU, but the use of hardware acceleration circuits may be controlled autonomously or by control circuitry separate from the application or the application hardware. It will be recognized by one skilled in the art, that the present exemplary embodiments may be practiced without some or all of these specific details. In other instances, well-known operations have not been described in detail in order not to unnecessarily obscure the present embodiments.

Hardware acceleration circuits may be implemented using a programmable logic device. A programmable logic device may include a partial reconfiguration region in which various hardware acceleration resources for performing specific tasks for one or more applications running on one or more virtual machines on a CPU may be implemented.

Figure 1:
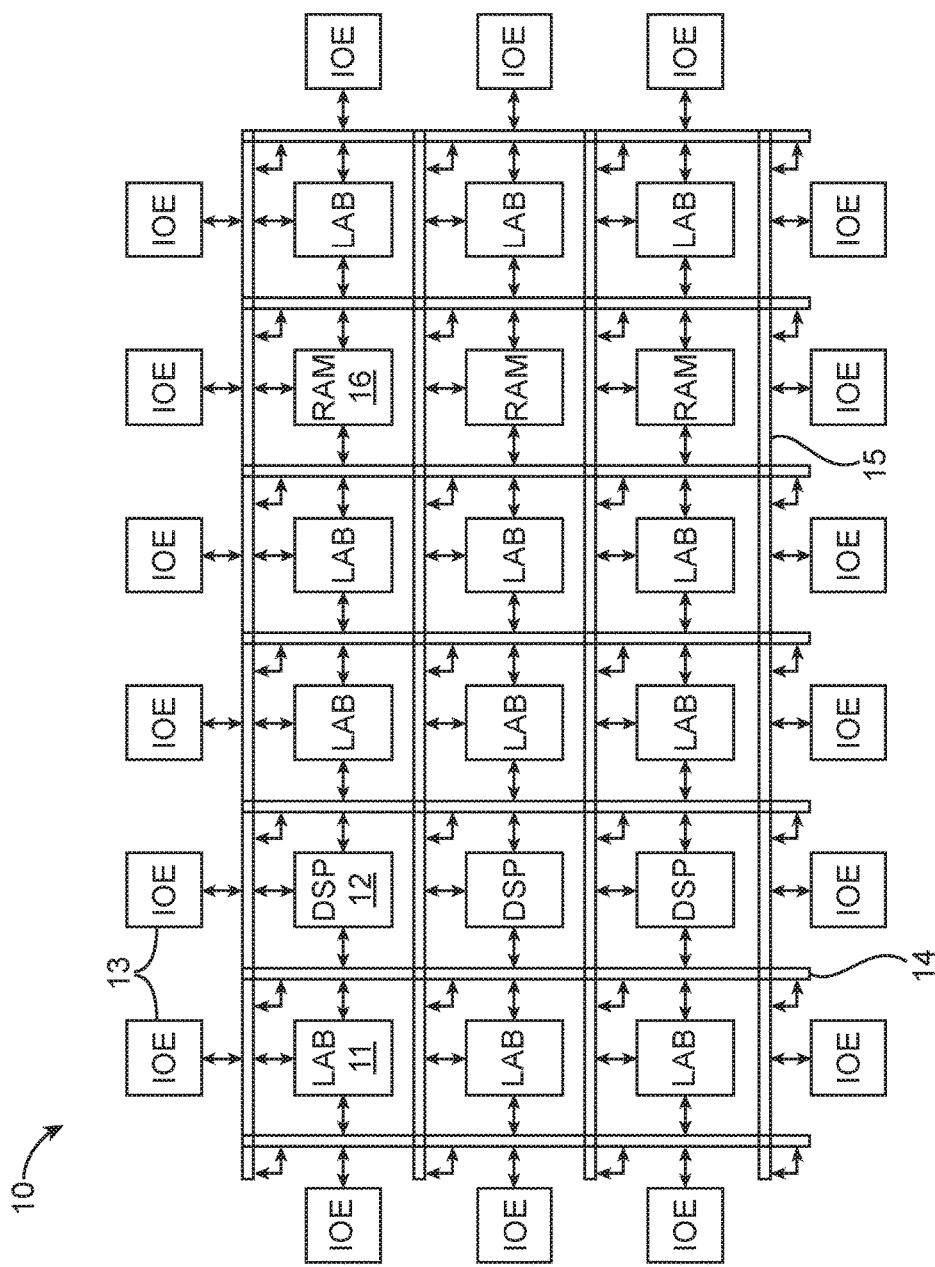
FIG. 1 is a diagram of an illustrative programmable integrated circuit in accordance with an embodiment.

An illustrative embodiment of an integrated circuit such as a programmable logic device (PLD) 10 that may be designed using computer-aided design tools is shown in FIG. 1. Programmable logic device 10 may have input-output (I/O) circuitry 13 for driving signals off of PLD 10 and for receiving signals from other devices. Input-output (I/O) circuitry 13 may include conventional input-output (I/O) circuitry, serial data transceiver circuitry, differential receiver and transmitter circuitry, or other circuitry used to connect one integrated circuit to another integrated circuit.

Programmable logic regions may include programmable components such as digital signal processing circuitry 12, storage circuitry 16, or other combinational and sequential logic circuitry organized in logic array blocks (LABs) 11. The programmable logic regions may be configured to perform a custom logic function. If desired, the programmable logic region may include digital signal processing circuitry 12 and storage circuitry 16 which both may be organized in specialized blocks that have limited configurability. The programmable logic region may include additional specialized blocks such as programmable phase-locked loop circuitry, programmable delay-locked loop circuitry, or other specialized blocks with limited configurability.

The circuitry of programmable logic device 10 may be organized using any suitable architecture. As an example, the logic of programmable logic device 10 may be organized in a series of rows and columns of larger programmable logic regions each of which contains multiple smaller logic regions. The smaller regions may be, for example, regions of logic that are sometimes referred to as logic elements (LEs) or basic logic elements (BLEs), each containing a look-up table, one or more registers, and programmable multiplexer circuitry. The smaller regions may also be, for example, regions of logic that are sometimes referred to as adaptive logic modules (ALMs), configurable logic blocks (CLBs), slice, half-slice, etc. Each adaptive logic module may include a pair of adders, a pair of associated registers and a look-up table or other block of shared combinational logic (i.e., resources from a pair of LEs—sometimes referred to as adaptive logic elements or ALEs in this context). The larger regions may be, for example, logic array blocks (LABs) or logic clusters of regions of logic containing multiple logic elements or multiple ALMs. The LABs 11 may also be referred to as "logic sectors," or "sectors of logic fabric." Generally, regions in PLD 10 that contain multiple LABs may be referred to as the "logic fabric" of the PLD 10.

Vertical interconnection resources 14 and horizontal interconnection resources 15 such as global and local vertical and horizontal conductive lines and buses may be used to route signals on PLD 10. Vertical and horizontal interconnection resources 14 and 15 include conductive lines and programmable connections between respective conductive lines and are therefore sometimes referred to as programmable interconnects.

Figure 2:
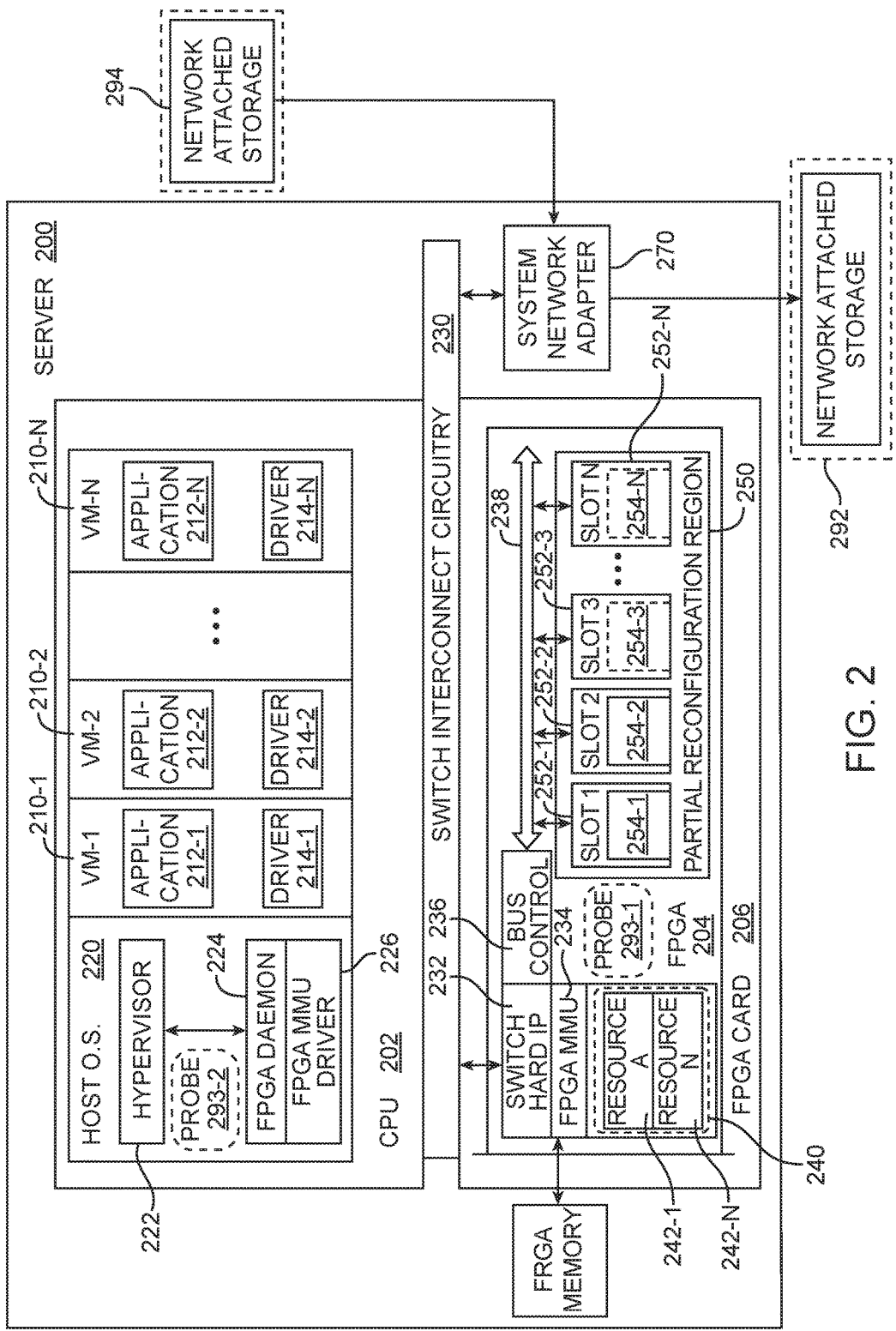
FIG. 2 is a diagram of a server that employs hardware acceleration resources in accordance with an embodiment.

FIG. 2 is a diagram of a server that employs hardware acceleration resources in accordance with an embodiment. A server 200 may include a central processing unit (CPU) 202 on which a host operating system (host OS) 220 is loaded. The operating system 220 may implement a hypervisor 222 that facilitates the use of virtual machines 210. Virtual machines 210 may be self-contained virtualizations that simulate an independent hardware computing resource. As all virtual machines 210 are run on the CPU 202, when CPU 202 is implemented as a single core (i.e., single processor) CPU, the virtual machines may allow for parallel processing of tasks on a single core CPU. While CPU 202 is illustrated in FIG. 2 as being a single component, CPU 202 may include multiple processors or cores on one or more integrated circuit dies.

Hypervisor 222 may also be formed on the CPU 202. Hypervisor 222 may be part of the software/firmware running on CPU 202 that is associated with the N associated virtual machines 210 (e.g., virtual machines 210-1, 210-2, . . . , 210-N). CPU 202 on which hypervisor 222 is installed may be referred to as the "host machine."

As described above, hypervisor 222 may serve as a virtual machine monitor that runs one or more virtual machines 210 on a server. Each virtual machine 210 may be referred to as a "guest machine," and each may run a guest operating system (OS). Each of the virtual machines 210-1, 210-2, . . . , 210-N are shown in FIG. 2 as having a single respective application 212-1, 212-2, . . . , 212-N. However, this is merely illustrative. On the guest OS of each of the virtual machines 210, one or more applications 212 may be run. Each of the virtual machines 210-1, 210-2, . . . , 210-N may also have one or more respective drivers 214-1, 214-2, . . . , 214-N. Drivers 214 may be a part of the kernel space of the virtual machines 210 that can only be installed, modified, or removed using privileged applications 212. Drivers 214 may be used to assist the applications 212 interface with the underlying hardware of the CPU, or the hardware acceleration resources provided by the FPGA card 206. Specifically, the drivers 214 may be used by the virtual machines 210 to interface with the hardware accelerator resources 254 in the partial reconfiguration region 250.

The hypervisor 222 presents the guest operating systems with a virtual operating platform and manages the execution of the guest operating systems while sharing virtualized hardware resources. Hypervisor 222 may run directly on the host's hardware (as a type-1 bare metal hypervisor) or may run on top of an existing host operating system (as a type-2 hosted hypervisor). If desired, additional virtualization drivers and tools (not shown) may be used to help each guest virtual machine communicate more efficiently with the underlying physical hardware of the CPU 202 or the hardware acceleration resources provided by the FPGA card 206.

The hypervisor 222 may be host OS 220 kernel level software (i.e., as opposed to user space software), and may be generally invisible to the user of the server 200. Parameters of the hypervisor 222 may be modified and inputs may be provided to the hypervisor 222 by privileged user space software on the host OS 220. An example of a privileged user space software on the host OS 220 that can communicate with the hypervisor 222 is the FPGA daemon 224. The FPGA daemon 224 may be privileged software that is used in communications with FPGA memory management unit (MMU) driver 226 as well. The FPGA MMU driver may also be referred to as the FMMU driver. While the server 200 is illustrated in FIG. 2 as having a FPGA card 206 that is coupled to FPGA memory via a FMMU, one skilled in the art will appreciate that FPGA components of 200 may be generally thought to be programmable or reconfigurable circuitry, and can be substituted with other forms of programmable or reconfigurable circuits.

The FMMU driver 226 may, like the hypervisor 222, be a kernel space program that is used to interface with the FPGA MMU (or, FMMU) 234 on the FPGA card 206 that is coupled to the CPU 202 using the switch interconnect circuitry 230. The switch interconnect circuitry 230 may include serial communications protocol switches, parallel communications protocol switches, or generally any suitable communications protocol switch. In some embodiments, the switch interconnect circuitry 230 may be a PCIe switch. Details about the operation of the PCIe switch are not provided herein to avoid unnecessarily obfuscation of the present invention.

The switch interconnect circuitry 230 may provide a signal pathway connecting the FMMU 226 and other components on the CPU 202 with the switch intellectual property (IP) block 232, which is also referred to as a "hard" IP block because it is relatively less programmable than "soft" logic blocks in the partial reconfiguration (PR) region 250 (the latter, PR region 250, being similar to the reconfigurable circuitry of FIG. 1). The switch IP block 232 may interface with the CPU 202 via the switch interconnect circuitry 230 and may be used for bi-directional communications between the circuitry on the FPGA card 206 and the CPU 202.

For example, the FMMU driver 226 may communicate with the FMMU 234 on the FPGA card 206 via the switch interconnect circuitry 230 and the switch IP block 232. The FMMU 234 may be coupled to FPGA memory that is shown in FIG. 2 to be off-chip (i.e., external to the FPGA card 206), but could alternatively be on the same circuit board as the FPGA card 206, a chip of a multi-chip package that includes at least a subset of the circuitry of the FPGA card 206, or part of the same chip on which at least a subset of the circuitry of the FPGA card 206 is formed. The FMMU 234 may be used to manage memory access operations with the FPGA memory. The FMMU 234 may receive memory access requests from the hardware accelerator resources 254 implemented in accelerator resource slots 252 on the partial reconfiguration region 250. The FPGA memory may include input/output data buffers and may be used as low-latency, high demand memory in a manner analogous to random-access-memory (RAM) in CPU based computers.

The accelerator resource slots 252 may each have a uniform structure, or may alternatively have varying capabilities. When the accelerator resource slots 252 are asymmetric, with one of the accelerator resource slots having different computing resources than another one of the accelerator slots, the identification of the accelerator resource slots 252 may be critical to ensuring that the hardware accelerator resources 254 are implemented on an appropriate one of the accelerator resource slots 252.

The accelerator resources slots 252 may include configurable or programmable logic circuitry onto which hardware accelerator resources 254 may be loaded. The hardware accelerator resources 254 may be loaded onto the accelerator resource slots via a partial reconfiguration of the accelerator resource slots 252. As certain hardware accelerator resources 254 assume or require particular computing resources to function properly, said certain hardware accelerator resources 254 may need to be loaded only on the accelerator resource slots 252 equipped with the particular computing resources that they assume or require.

The FMMU 234 may contain at least four registers: (1) the FM_FH_PNTR register, which is used to store a file handle in the FMMU 234, (2) the FM_SRC_MIRROR_ID register, which is used to store an identifier for the source server on which the application to be migrated is running, (3) the FM_DST_MIRROR_ID register, which is used to store an identifier for the destination server onto which the application to be migrated is to be transferred, and (4) the FM_CNTRL register, which contains two control bits: (i) the S control bit for placing the FMMU into a snapshot mode, denoted FM_CNTRL[S] and (ii) the M control bit for placing the FMMU 234 into a mirror mode, denoted FM_CNTRL[M].

On the FPGA card 206 itself, shared resources 240 may be provided. Resources such as 242-1 through 242-N may correspond to partial reconfiguration images for the slots 252 of the partial reconfiguration region 250, or may correspond to drivers or other resources that can be used by the FMMU 234, or bus control circuitry 236. The bus control circuitry 236 may be used to manage communications on the bus 238.

Both the CPU 202 and the FPGA card 206 may be coupled to a system network adapter 270. The system network adapter may couple the server 200 to the internet, an intranet, or a local area network (LAN) via Ethernet protocols, optical communications protocols, or any other suitable protocol. The switch interconnect circuitry 230 may act as the interface between the CPU 202 and the FPGA card 206. The system network adapter 270 may be illustrated as being directly coupled to the CPU 202 or the FPGA card 206 as well.

The system network adapter 270 may be used to couple the server 200 to network attached storage (NAS) units 292 and 294. While the connections between the network attached storage units 292 and 294 are shown as unidirectional (i.e., with the NAS unit 294 providing data to the system network adapter 270 and the NAS unit 292 receiving data from the system network adapter 270), it will be appreciated by those skilled in the art that the respective connections between the system network adapter 270 and the NAS units 292 and 294 may also be bi-directional connections. Network attached storage units 292 and 294 may include predefined configuration bitstreams for the programmable circuitry, or can be allocated to dedicate a portion of its storage to servers for storing information related to the state of its virtual machines 210 or its hardware acceleration resources 254. Allocated portions of the NAS units 292 and 294 may be referenced using file pointers or handles that can be shared between multiple servers 200 that are coupled to the NAS units, so that the multiple servers 200 can access the allocated portions with a common file pointer or handle.

A quality of service measuring tool may measure parameters of interest for a given application, such as the share of CPU resources used by the application, the amount of disk space used by the application, the amount of memory used by the application, network latency of the application, general latency of the application. Generally, these parameters or metrics may be directly measured, or derived from data collected by probes on the virtual machines on which the application is running. Servers may have different capabilities, and may have differences in processors, amount of disk space, available memory, or any other aspect of computing equipment.

In FIG. 2, probes 293 may represent the aforementioned quality of service measuring tools. A probe 293-1 may be provided on the FPGA card 206 for monitoring performance and operating conditions of the hardware acceleration resources 254 running on the accelerator slots 252. The probe 293-1 may monitor transactions from the hardware acceleration resources 254 on the bus 238 to track quality of service parameters for the hardware acceleration resources 254 such as wait time for memory access requests to the FPGA memory, available bandwidth to the hardware acceleration resources 254, or any other relevant quality of service metric. Another probe 293-2 may be provided at the CPU 202 to monitor quality of service metrics associated with applications 212 and/or the virtual machines 210.

When an application has demands or requirements that exceed the capabilities of the server on which the application is running, service may be degraded, or the application may be moved to a more capable server. The quality of service parameters or metrics that are measured or derived may be used to estimate the demands or requirements of the applications running on a server, and may be used to determine whether an application needs to be migrated from once server to another server.

Applications that are probed in this way may be monitored to ensure that quality-of-service margins or tolerances are not violated on the server. As an example, a customer may order server computing resources for an application with the expectation that quality-of-service of the application will fall within a certain range. When probe circuitry 293 discovers a violation of these parameters, corrective action may require live migration of the application to another server.

Figure 3A:
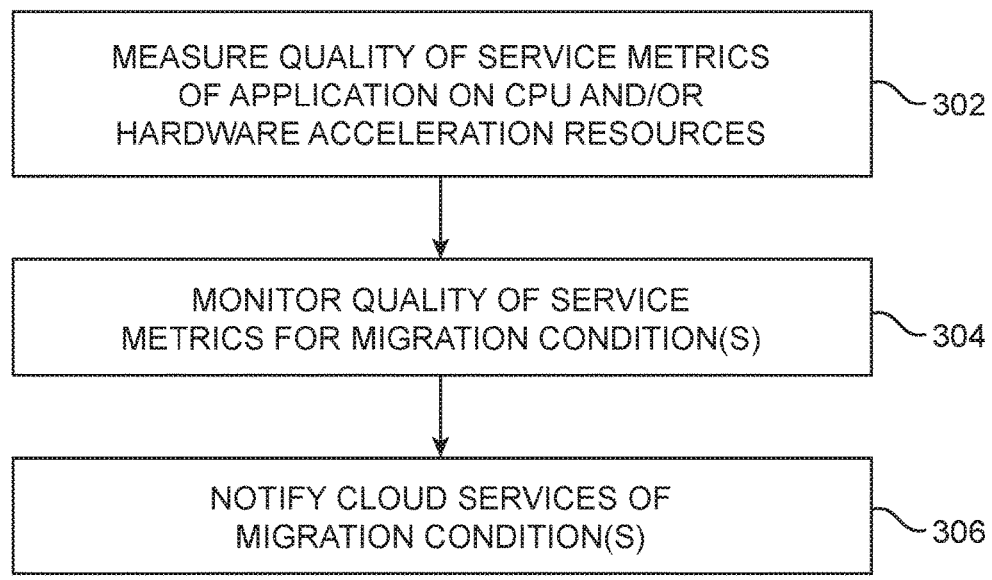
FIG. 3A is a flowchart of steps for determining when live migration of an application is required in accordance with an embodiment.

FIG. 3A is a flowchart of steps for determining whether a live migration of an application to another server is required. At step 302, probes such as probes 293-1 and 293-2 may be used to measure quality of service (QoS) metrics on the FPGA card 206 and the CPU 202, respectively. Probe 293-1 may measure QoS metrics for hardware acceleration resources 254 implemented in the accelerator resource slots 252 associated with a given application, and probe 293-2 may measure QoS metrics for the virtual machines 210 and the applications 212. The measuring step 302 may be performed continuously throughout the runtime of an application of interest on the server.

At step 304, the measured QoS metrics may be monitored for migration conditions. Migration conditions may describe degradation in QoS metrics that result in a given application falling outside of user-specified performance thresholds or ranges. One way to determine migration conditions is to record instances of adverse performance—instances where particular QoS metrics drop below a predetermined or user-specified threshold, or move outside a predetermined or user-specified range—as "events."

To avoid unnecessary and frequent migration of the application, a migration condition may require multiple such events to occur before a migration condition is met. A migration condition may also be met when one or more QoS metrics drop below a predetermined or user-specified threshold, or move outside a predetermined or user-specified range for a period of time that exceeds a predetermined or user-specified threshold.

At step 306, cloud services that orchestrate the live migration of application between servers, or more generally network control services implemented on hardware coupled to the server via the network, may be notified of the migration condition. Upon receiving a notification of the migration condition at the network control services, live migration of the application may commence.

Figure 3B:
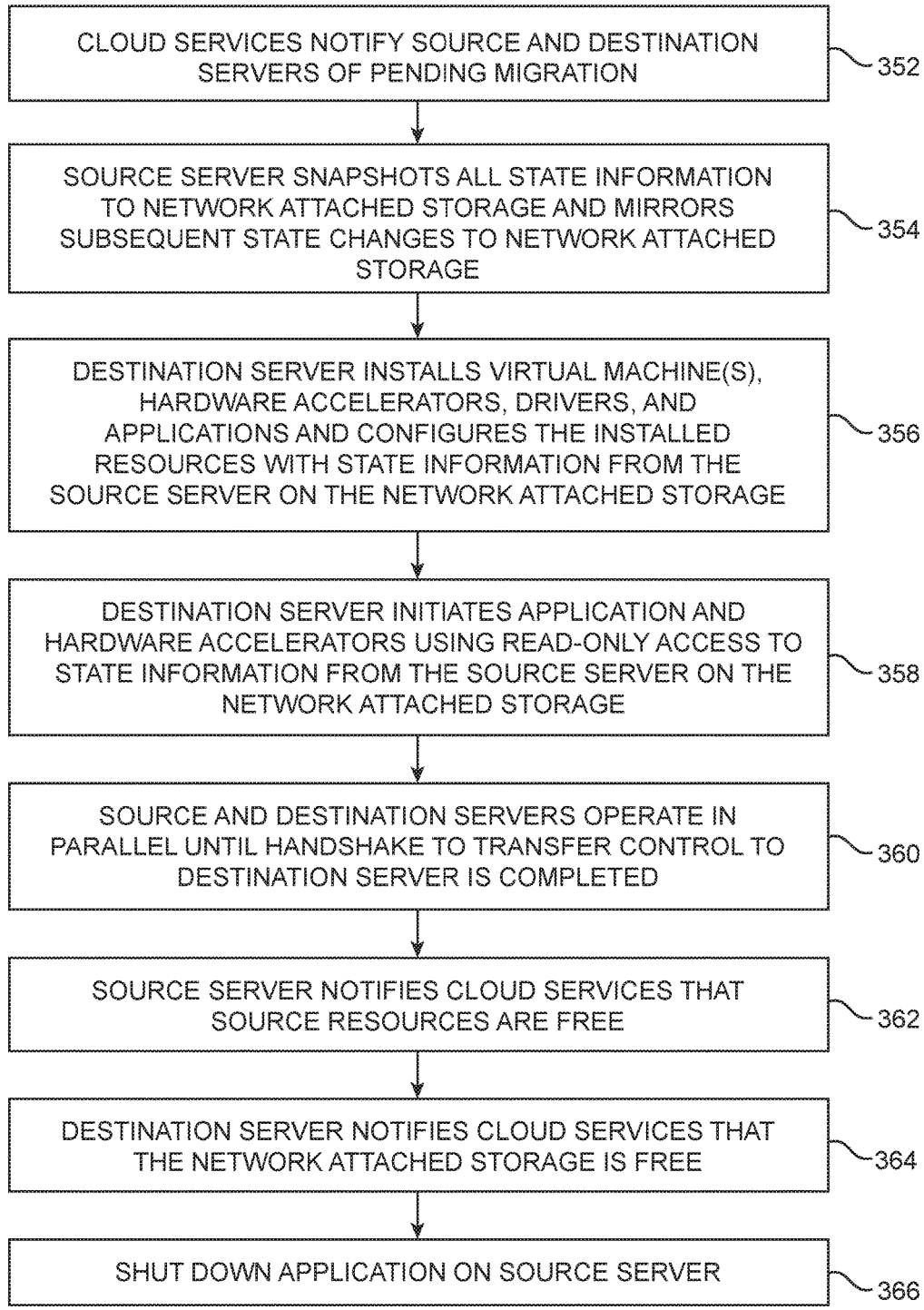
FIG. 3B is a flowchart of steps for performing live migration of an application that utilizes hardware acceleration resources from a source server to a destination server in accordance with an embodiment.

FIG. 3B is a flowchart of steps for performing live migration of an application that utilizes hardware acceleration resources from a source server to a destination server in accordance with an embodiment. The server 200 of FIG. 2 may be a source server, or a destination server. Live migration refers to the migration of an active application of a source server (i.e., an application that is running on the source server's computing resources) to a destination server. The source and destination servers may, for the purposes of illustration of the present invention, be identical in their computing resources and internal computing topology. This assumption, however, is merely made so that the explanation of the salient features of this invention are not unnecessarily obscured. The destination server must merely have the computing resources necessary to run the application to be migrated from the source server.

The resources to be migrated from one server to another may include (1) one or more virtual machines such as virtual machines 210, (2) one or more applications running on said one or more virtual machines 210 such as applications 212, (3) one or more hardware accelerators used by said one or more applications such as hardware accelerators 254, and (4) the drivers associated with said one or more hardware accelerators such as drivers 214. For convenience, the collection of these resources may be denoted as RSRC_0 for the illustrative examples of live migration described below.

As described above, the present invention relates to the live migration of an application that uses hardware acceleration resources. The hardware acceleration resources (such as resources 252 of FIG. 2) may be partial reconfigurations of programmable logic blocks in a partial reconfiguration region 250. The method of FIG. 3B serves as a general outline to the method of such a live migration, which will be further explained in FIGS. 4-12.

At step 352, cloud services, or more generally, network control services implemented on hardware coupled to the server via a network, may notify source and destination servers of a pending migration. Network control equipment may perform the notification of step 352 in response to receiving an indication that a migration condition such as the conditions described in connection with steps 304 and 306 of FIG. 3A has been met. The notification to source and destination servers of the pending migration is described in detail in connection with steps 402 and 502 of FIGS. 4A and 5A, respectively.

At step 354, a snapshot of one or more of the virtual machines running of a source server (i.e., a server 200 on which the application to be migrated is running) may be copied onto a network attached storage unit (such as NAS unit 292/294). The snapshot of the one or more virtual machines on the server may include the state information of the virtual machines at a given point in time. Being a snapshot, the state of the virtual machines that is saved to the network attached storage unit may not reflect changes that occur to the state(s) of the one or more virtual machines on the source server.

State changes that occurred on the one or more virtual machines of the source server may be mirrored onto the snapshot of the one or more virtual machines on the network attached storage unit coupled to the source server during step 354 as well. Step 354 may describe a recurring process that repeatedly occurs after step 352. Post-snapshot changes to the one or more virtual machines may be copied over the previous states from the snapshot that are saved in the network attached storage unit.

As step 354 relates to snapshotting and mirroring of all state information to network attached storage hardware accelerator resources configurations may also be saved to the network attached storage unit in a snapshot-like mode to begin with. In other words, the state of the hardware accelerator resources at a given time on the source server may be saved to a network attached storage unit. Once the snapshot of hardware accelerator resources' states is saved, any subsequent changes to said states of the hardware accelerator resources may be mirrored onto the network attached storage unit.

Virtual machine snapshots updated after mirroring operations and hardware accelerator states updated after mirroring operations saved from the source server onto the network attached storage in step 354 may be loaded onto the destination server at step 356. Also during step 356, drivers and applications associated with the application to be migrated are also installed onto the destination server. At step 358, the destination server may initiate the application and associated hardware accelerators using read-only access to the state information provided by the source server on the network attached storage.

At step 360, the destination server may be operated in parallel with the source server until the synchronization between the virtual machines and hardware accelerators on the destination server and their images on the network attached storage are synchronized. Step 360 may be performed until a handshake operation to transfer control of the application to the destination server is completed.

At step 362, the source server may notify the network control equipment or cloud services that the resources previously used by the application that was migrated are free and can be used for other applications. At step 364, the destination server may notify the network control services or cloud services that the network attached storage is free and can be used for other purposes. At step 366, the application on the source server may be shut down and the resources used for executing the application may be used for other purposes.

Prior to step 366, if there is any problem in the live migration of the application(s) from the source server to the destination server, the migration process can be halted without any runtime disadvantages to the application, at least because the source server is still operating independently prior to step 366. In the case of a failure in the live migration operation, the destination server may simply be disconnected or restarted, while the source server continues to host the application and perform its functions.

Some applications may operate strictly in real-time. Examples of strictly real-time applications may be safety critical applications that relate to controls for equipment that can cause harm to life or property in the event of a malfunction. Another example of real-time applications may be applications that are dependent on links to external equipment such as satellites that are difficult to re-negotiate or re-establish. These applications may be difficult to migrate using typical live migration methods because the downtime entailed by taking the application offline and moving the hardware resources to another server may result in serious degradation to performance metrics (such as the aforementioned QoS metrics). In other words, these applications may be unable to "pause" as is required in traditional migration methods, but may be capable of live migration using the methods associated with the present invention.

Other applications such as video processing applications may be somewhat resilient to pausing during migration, but the pausing may be noticed by an end user. In the example of video processing applications, the end user may notice that frames are dropped when the applications are migrated using traditional migration methods. However, using the methods described in connection FIGS. 3B and 4-12, such applications may be migrated with minimal (if any) performance degradation that can be detected by the end-user, or otherwise.

Figure 4A:
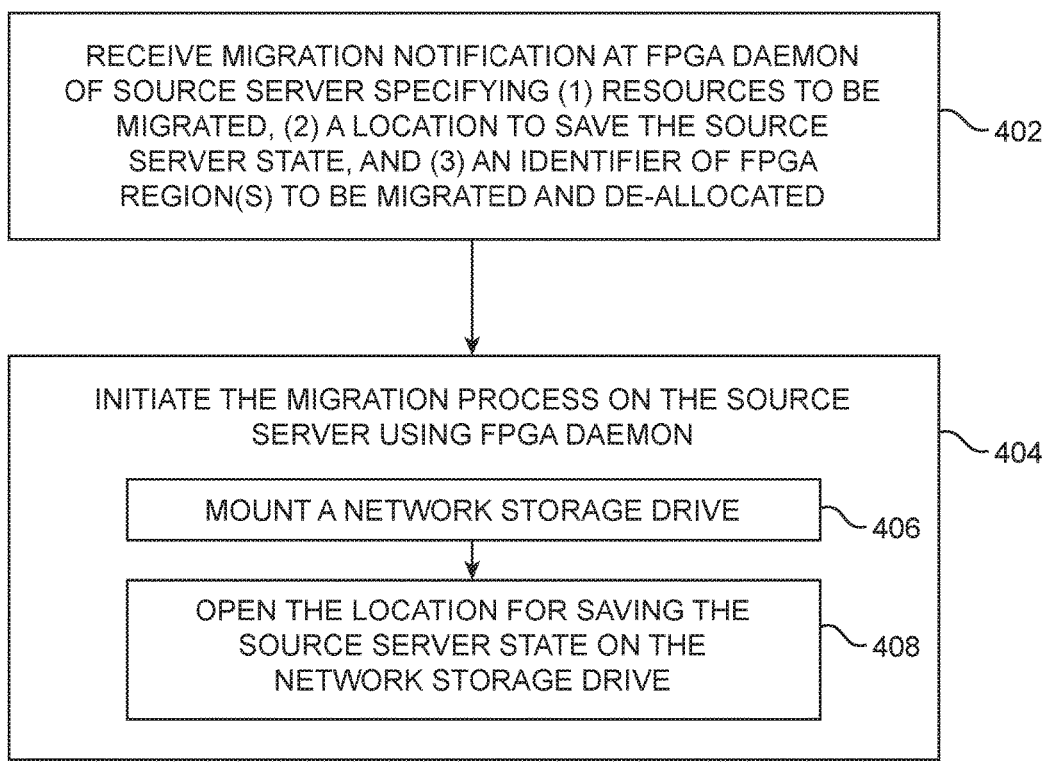
FIG. 4A is a flowchart of steps for a source server during the initialization stages for live migration of an application that utilizes hardware acceleration resources.

FIG. 4A is a flowchart of steps for a source server during the initialization stages for live migration of an application that utilizes hardware acceleration resources. The flowchart of FIG. 4A illustrates the server-side operations that occur during the initialization of the live migration of an application that utilizes hardware acceleration resources. Notably, the flowchart of FIG. 4A may occur prior to step 352 of FIG. 3.

Figure 4B:
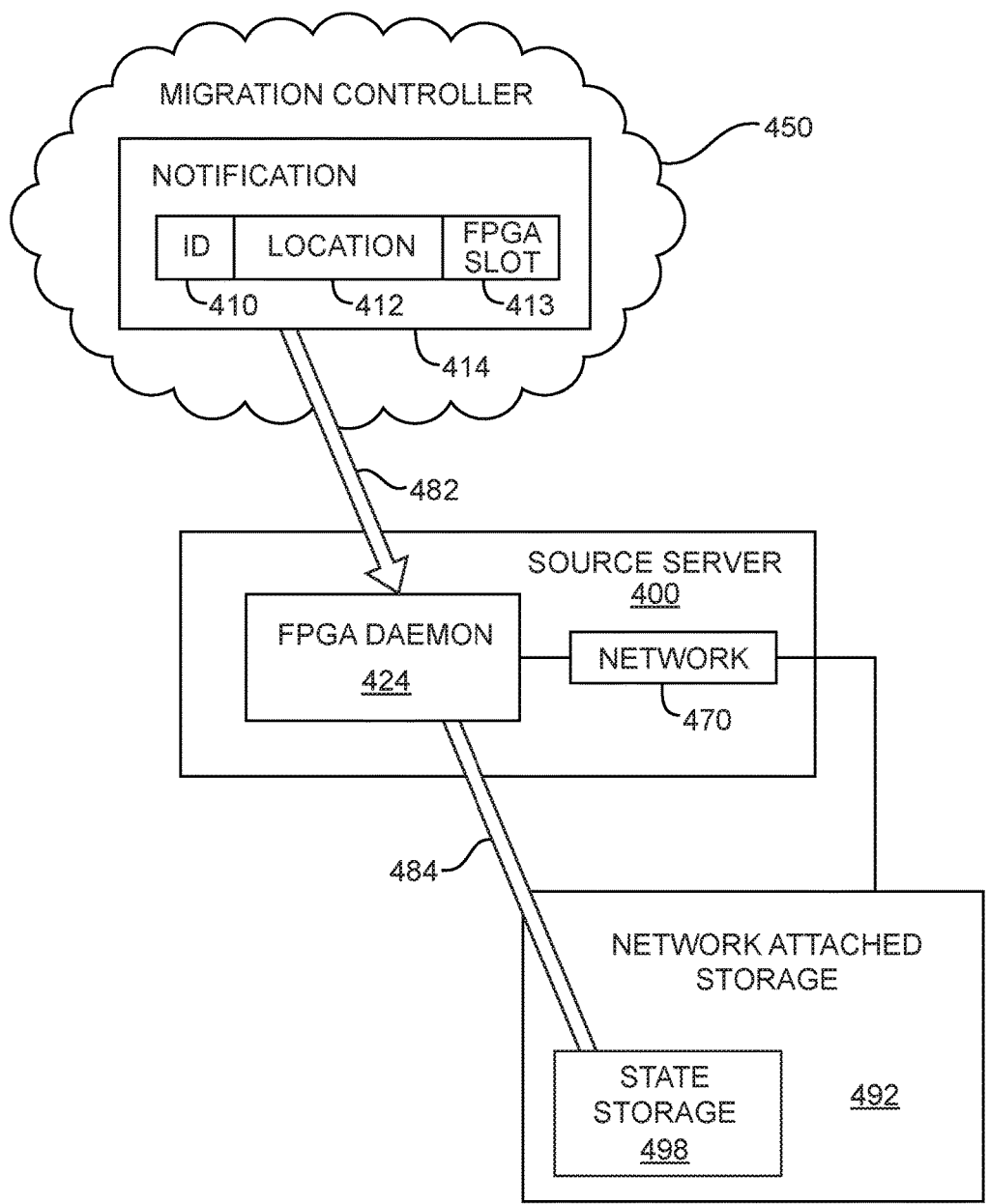
FIG. 4B is a diagram of a source server that illustrates communications during the initialization stages for live migration of an application that utilizes hardware acceleration resources.

FIG. 4B is a diagram of a source server that illustrates communications during the initialization stages for live migration of an application that utilizes hardware acceleration resources as described in FIG. 4A. At step 402 of FIG. 4A, the FPGA daemon of the source server may receive a migration notification for the source server that specifies the resources that are to be migrated to a destination server, a network location on the network attached storage unit in which to save the state information of the resources to be migrated, and an identifier for regions of the programmable circuitry (such as the acceleration resource slots 252) that may have their associated hardware accelerators 254 migrated and that may be deallocated subsequent to the completion of the migration.

A migration controller may notify the source server that a migration will occur. The migration controller may be an external cloud services process. As shown in FIG. 4B, the migration controller 450 provides a notification 414 that includes an ID 410 that specifies which resources will be migrated, a location 412 that specifies what location in the NAS 492 to use for intermediate storage of machine state, and a FPGA slot identifier 413 that identifies which particular acceleration resource slots 252 will have their associated hardware accelerators 254 migrated. The slots specified in FPGA slot identifier 413 may be deallocated for use by other applications upon successful migration of the application resources specified by the ID 410. It should be noted that the migration controller may also select a destination server for the migration at the time the notification 414 is sent to the source server 400; however, this information is not needed by the source server. Transmission (or function call) 482 of the notification 414 to the FPGA daemon 424 may occur over the network on which the source server 400 is connected (not pictured in FIG. 4B).

In addition to specifying which resources to migrate (via the ID 410 of the notification 414) the migration notification also provides the source server a location 412 for intermediate storage of machine state. This location 412 will be accessible to both the source and destination servers using the network file system (NFS) protocol. This storage location may be referred to as NFS_STORAGE.

As described above, RSRC_0 may refer to a collection of (1) one or more virtual machines such as virtual machines 210, (2) one or more applications running on said one or more virtual machines 210 such as applications 212, (3) one or more hardware accelerators used by said one or more applications such as hardware accelerators 254, and (4) the drivers associated with said one or more hardware accelerators such as drivers 214. The ID 410 of the resources on the source server 400 to be migrated may be denoted as src_RSRC_0, and the ID may include details about the same elements (i.e., the virtual machines, applications, hardware accelerators, and drivers) described above in connection with RSRC_0.

FPGA daemon 424 may be coupled to a system network adapter 470 (labeled as network 470) that may be similar to the system network adapter 270 described above in connection with FIG. 2. The network attached storage (NAS) 492 may be coupled to the FPGA daemon through the network 470. The migration notification sent to the source server in step 402 is received by a process running in the host operation system environment on the source server 400, similar to the host OS 220 of FIG. 2. This process that receives the migration notification can be the host hypervisor (similar to hypervisor 222 of FIG. 2), the host FPGA daemon 424, or both.

For the purposes of clarity in the example described below, only the FPGA daemon 424 is used to coordinate the migration. The notification of the FPGA daemon 424 may be implemented as a function call:

bool                    FPGA_daemon::migrationSource(uid_t src_RSRC_0, url_t NFS_STORAGE)

The FPGA daemon 424 may receive the indication that src_RSRC_0 (i.e., the resources specified in ID 410) will be migrated. The bool indicator may signify that the return value of the migrationSource function is a Boolean value, and the "uid_t" and "url_t" indicators specify the data type of the src_RSRC_0 and NFS_STORAGE values, respectively.

At step 404, the FPGA daemon 424 may be used to initiate the migration process on the source server. Sub-step 406 of step 404 may involve the NAS 492 being mounted to the source server 400. FPGA daemon 424 may then create an NFS mount point which points to NFS_STORAGE (i.e., the location specified in location 412). This mount point appears as a directory in one of the virtual machines running on the source server 400 (similar to the virtual machines 210 of FIG. 2).

At step 408, the location on NAS 492 corresponding to the location 412 received in the notification 414 may be used to open a corresponding state storage location 498 (i.e., the location referred to as NFS_STORAGE above). FPGA daemon 424 may make the directory (i.e., the mount point corresponding to the NFS_STORAGE location) writable by src_RSRC_0 (i.e., the resources to be migrated). This mount point may be labeled FH_STORAGE (file handle storage). The location specified by FH_STORAGE will hold the machine states during the migration of src_RSRC_0 (as described in connection with steps 352-356 of FIG. 3). The location specified by FH_STORAGE may be updated by the running processes within src_RSRC_0 and may be utilized to bring up a destination version of the resources to be migrated, dst_RSRC_0, with minimal interruption of the processes within src_RSRC_0 that are running on the source server 400. The link 484 of FIG. 4B may illustrate the connection to the state storage portion 498 of the NAS 492 that is enabled by the aforementioned mounting step 406 and opening of the mount point step 408 of FIG. 4A.

Notably, a single file handle is described for intermediate storage. This is to promote clarity in the description. An implementation of this invention may use multiple file handles, a single file handle with an indexed file, separate directory trees containing file handles, or other file structures. The principle feature is the use of file handle(s) present in a location accessible by the source and destination servers. The remaining discussion will continue to reference only a single file handle.

Figure 5A:
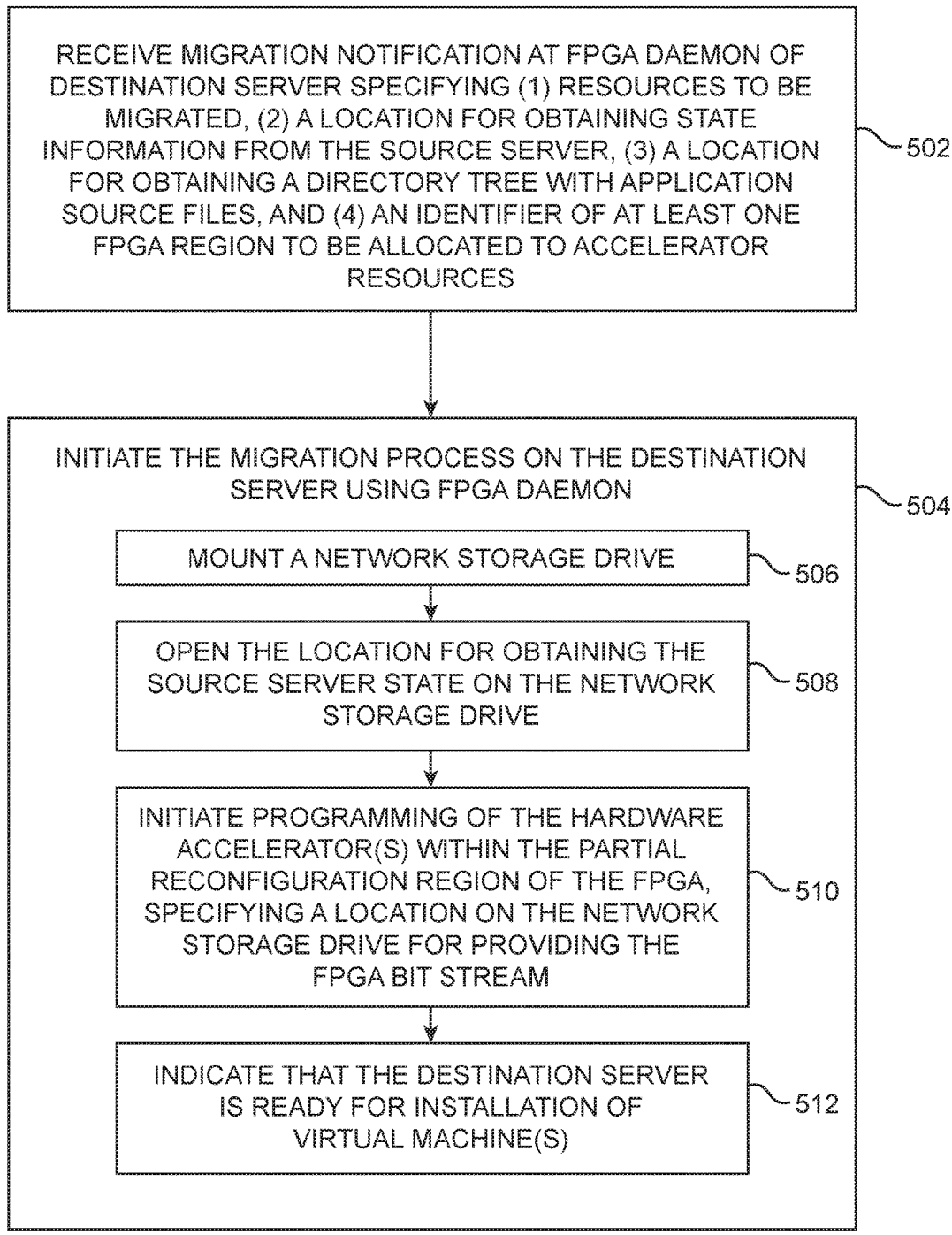
FIG. 5A is a flowchart of steps for a destination server during the initialization stages for live migration of an application that utilizes hardware acceleration resources.
Figure 5B:
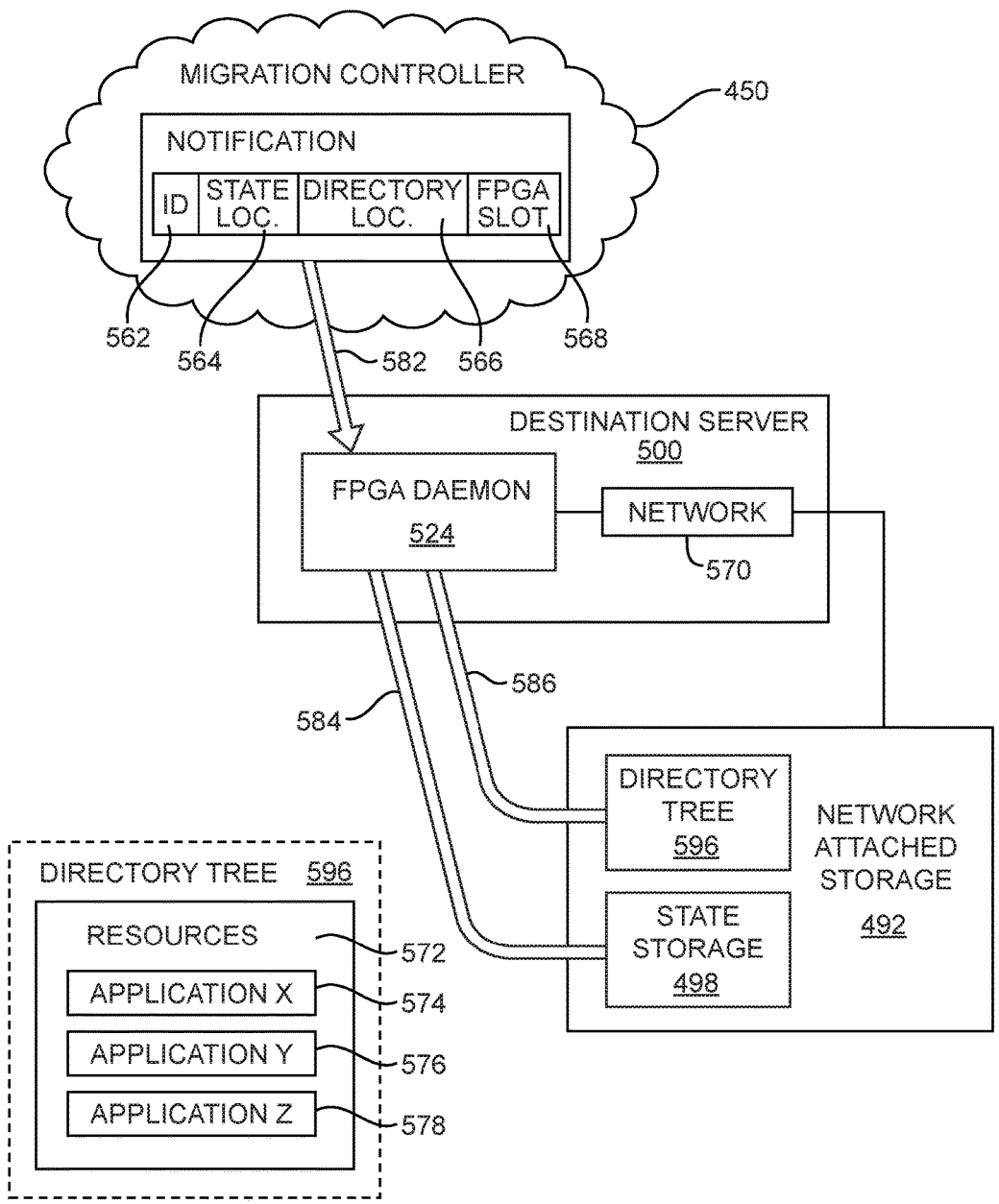
FIG. 5B is a diagram of a destination server that illustrates communications during the initialization stages for live migration of an application that utilizes hardware acceleration resources.

FIG. 5A is a flowchart of steps for a destination server during the initialization stages for live migration of an application that utilizes hardware acceleration resources. FIG. 5B is a diagram of a destination server that illustrates communications during the initialization stages for live migration of an application that utilizes hardware acceleration resources as shown in FIG. 5A.

In step 502, a destination server 500 as shown in FIG. 5B may receive a migration notification at FPGA daemon 524 of the destination server specifying (1) resources to be migrated (i.e., the ID 562), (2) a location for obtaining state information from the source server (i.e., the state location 564), (3) a location for obtaining a directory tree with application source files (i.e., the directory location 566), and (4) an identifier of a FPGA region to be allocated to accelerator resources (i.e., the FPGA slot ID 568).

The notification of step 502 may be provided by the migration controller 450 in the form of a transmission or function call 582, which may be noted as:

bool Avfd::migrationDestination(uid_t dst_RSRC_0, pr_region_id_t slot_ID, url_t NFS_STORAGE, url_t NFS_APPLICATION)

The ID 562 may be referred to as dst_RSRC_0, the state location 564 may be referred to as NFS_STORAGE, the directory location 566 may be referred to as NFS_APPLICATION, and the FPGA slot_ID 568 may be referred to as slot_ID.

Notably, dst_RSRC_0 (i.e., the ID 562) may be identical to the src_RSRC_0 identifier used previously in the notification 414 provided to the source server 400 in the transmission (or function call) 482 of FIG. 4B. The name change is used to refer to the source and destination versions of these resources, the value is identical (i.e., the resources to be migrated specified in the IDs 410 and 562 may be the same). The slot_ID (i.e., the FPGA slot_ID 568) may specify which partial reconfiguration (PR) region (such as the slots 252 in the partial reconfiguration region 250) to use to program the hardware accelerator(s).

The NFS_STORAGE URL may be identical to that used in the migrationSource( ) function call described above in connection with step 402 of FIG. 4A and the function call 482 of FIG. 4B. This location contains the intermediate machine state mirrored by the source resources, src_RSRC_0, and may be represented by the state storage portion 498 of the NAS 492 in FIGS. 4B and 5B.

The NFS_APPLICATION URL may refer to the location of the application file set. Particularly, this URL is the root of a convention enforced directory tree that contains collateral files holding application components such as the user space executable, hardware accelerator kernel driver, and the FPGA bit stream file. This location may be represented by the directory tree portion 596 of the NAS 492 of FIG. 5B. As shown in FIG. 5B, the directory tree portion 596 may include resources 572 that include an application X 574 such as the user space executable, an accelerator Y 576 such as the FPGA bit stream file, and a driver Z 578 such as the hardware accelerator kernel driver. While only one of each of application X 574, accelerator Y 576, and driver Z 578 is illustrated in the resources directory 572 of the directory tree 596, it will be appreciated by one skilled in the art that any number of applications 574, accelerator bit streams 576, or drivers 578 may be provided in the directory tree portion 596 of the NAS 492.

In step 504, the migration process on the destination server 500 may be initiated using the FPGA daemon 524. Specifically, in response to the migrationDestination( ) function call 582, the FPGA daemon 524 may mount the NFS_STORAGE location in the host operating system directory tree and, in step 508, open a file handle to the intermediate storage. This file handle is called FH_STORAGE (as it was in connection with the source server 400). The file handle FH_STORAGE may point to the state storage portion 498 of the NAS 492. The link 564 between the FPGA daemon 524 and the state storage portion 498 of the NAS 492 may represent the access to the state storage portion 498 of NAS 492 after step 508.

In step 510, the programming of the hardware accelerator(s) within the partial reconfiguration region of the destination server 500 may be initiated by using the FPGA daemon to mount the NFS_APPLICATION location in the host operating system directory. The permissions for these trees are set for root access only. The mounting of the NFS_APPLICATION location may be represented by the link 586 to the directory tree portion 596 of the NAS 492. NFS_APPLICATION is an NFS mount to a known directory tree format.

Any format for the directory tree 596 is possible, and an example of one such format is provided below:

/system/mount/point/
|-- RSRC_0
| |-- bin
| |'-- App_0.exe
| |-- bitstream
| |'-- Accel_0.bs
| |-- drivers
| |'-- Driver_0.ko The only requirement for the directory tree 596 is that the FPGA daemon 524 is able to find the bit stream (such as Accel_0.bs, represented by accelerator Y 576 in FIG. 5B), the driver (such as Driver_0.ko, represented by driver Z 578), and the user space application executable (such as App_0.exe, represented by application X 572). A conventional directory structure is used for illustrative purposes.

Still referring to step 510, after creating the NFS mounts (i.e., to NFS_STORAGE and NFS_APPLICATION), FPGA daemon 524 subsequently opens the file Accel_0.bs (or, the accelerator Y 576) for root read access. This file is the hardware accelerator's FPGA bit stream for the PR region. This file handle may be called FH_BITSTREAM.

FPGA daemon 524 may then call a function in the Platform Application Layer (PAL) running within the host operating system on the destination server 500 to initiate programming of the hardware accelerator within an FPGA PR region.

This function call may be represented as:

bool Pal::installBitStream(uid_t dst_RSRC_0, FILE *FH_BITSTREAM)

On completion of installBitStream( ) the FPGA daemon 524 may, in step 512, return success (i.e., a Boolean "true" value) to the migrationDestination( ) function called by the migration controller 450 (i.e., FPGA daemon 524 may return "true" to the function call 582). This return of step 512 indicates to the cloud layer that the destination server is ready for VM installation.

Figure 6A:
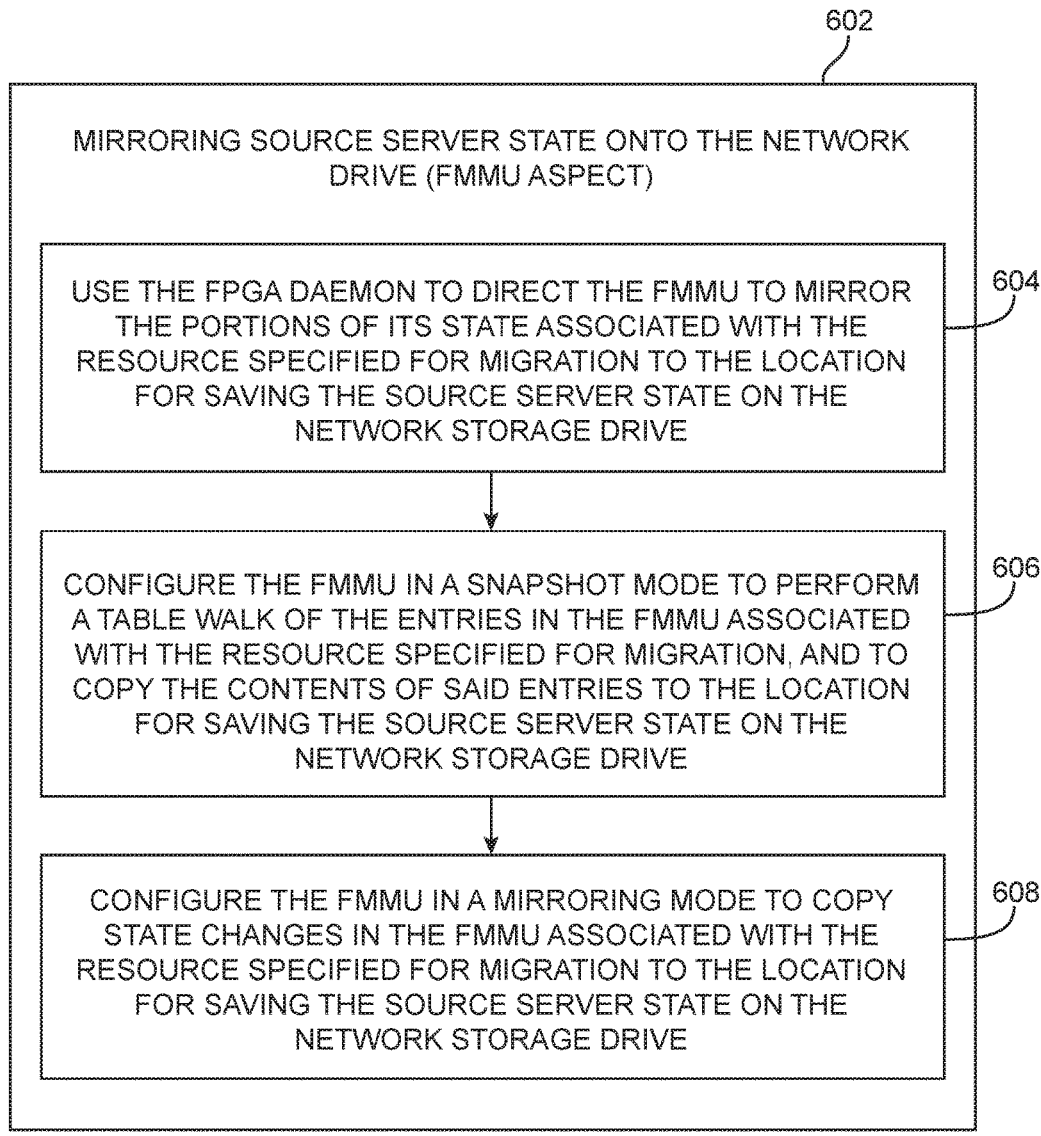
FIG. 6A is a flowchart of steps for the source server to mirror the state of its programmable circuitry memory management unit during live migration in accordance with an embodiment.
Figure 6B:
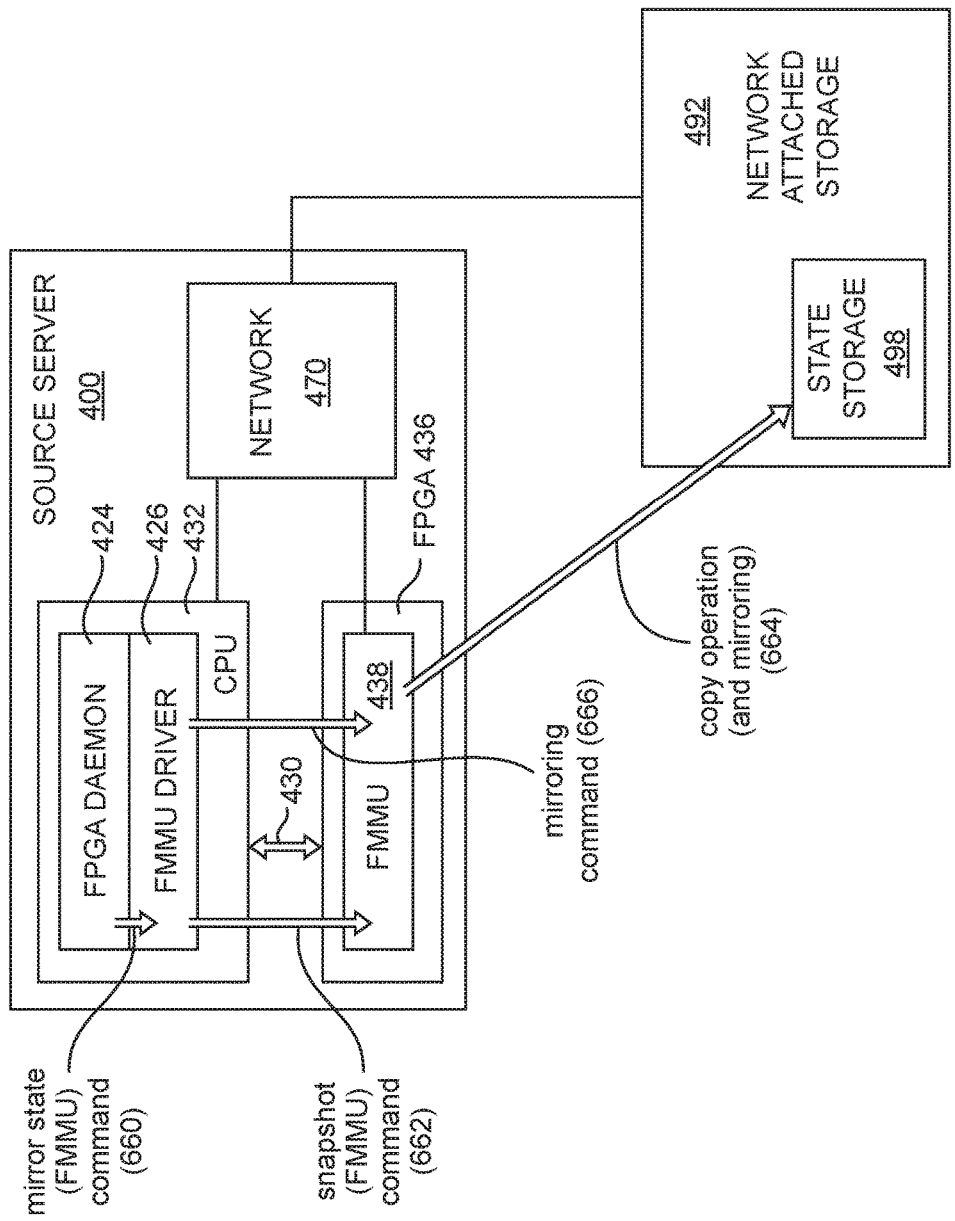
FIG. 6B is a diagram of the source server and its communications during the state mirroring of its programmable circuitry memory management unit during live migration in accordance with an embodiment.

FIG. 6A is a flowchart of steps for the source server to mirror the state of its programmable circuitry memory management unit during live migration in accordance with an embodiment. FIG. 6B is a diagram of the source server and its communications during the state mirroring of its programmable circuitry memory management unit during live migration in accordance with an embodiment.

In step 602 of FIG. 6A, which at the source server 400 side may occur after step 404 of FIG. 4A, the aspect of the source server that is related to the FPGA MMU (FMMU) may be mirrored on the network drive. Turning to FIG. 6B, the FMMU 438 may have its state mirrored to the state storage portion 498 of the NAS 492. In step 604, the FPGA daemon 424 may be used to direct the FMMU to mirror the portions of its state associated with the resource(s) specified for migration (in ID 410 of FIG. 4B, or src_RSRC_0) to the state storage portion 498 of NAS 492 (which was specified by location 412 of FIG. 4B, or NFS_STORAGE).

In step 604, the FPGA daemon 542 may call a FMMU driver function mirrorState( ). This function may indicate the identifier of the resources to be migrated and the location for intermediate storage. The function prototype is shown below:

bool   FmmuDriver::mirrorState(uid_t   src_RSRC_0, FILE*FH_STORAGE);

The function call mirrorState from the FPGA daemon 542 to the FMMU driver 426 is indicated by the mirror state (FMMU) command 660 of FIG. 6B. In response to the mirrorState function call, the FMMU driver 426 may write three memory mapped registers in the FMMU hardware (i.e., the registers described above in connection with the FMMU 234 of FIG. 4). Specifically, the FM_FH_PNTR register, which is used to store a file handle in the FMMU 234, may be written with the address of FH_STORAGE which was provided as an argument of the mirrorState function call, and which is a file handle for the mount point for the state storage portion 498 of the NAS 492. The register FM_SRC_MIRROR_ID, which is used to store an identifier for the source server on which the application to be migrated is running, may be written with the identifier src_RSRC_0, which as described in connection with FIG. 4, identifies the resources to be migrated from the source server 400. In connection with the FMMU 234/438, the src_RSRC_0 identifier may be used to uniquely identify the state(s) in the FMMU 438 that belong to (or are associated with) the resources identified in src_RSRC_0. Finally, the register FM_CNTRL may have its S control bit (FM_CNTRL[S]) for placing the FMMU into a snapshot mode set to 1 (or a logic high value) and its M control bit FM_CNTRL [M] for placing the FMMU 234 into a mirror mode set to 0 (or a logic low value).

Setting the FM_CNTRL[S] bit to 1 may be indicated by the snapshot (FMMU) command 662 of FIG. 6B, and may cause the FMMU 438 hardware to perform a table walk of the entries in the FMMU 438, as described in step 606. The snapshot command 662 command may be transmitted to the FMMU 438 via the switch interface 430. The table walk of the entries in the FMMU 438 may result in the entries that are associated with the resources to be migrated (identified using src_RSRC_0) to be copied over to the state storage portion 498 of the NAS 492. Pseudo-code for the table walk of step 606 is shown below:

```
while (FM_CNTRL[S] == 1) {
    for (each entry in MMU_table) {
        if (entry.valid_bit && entry.context_id ==
            FM_SRC_MIRROR_ID) {
            write entry to FM_FH_PNTR;
            for (each address in entry.page) {
                write (address, *address) to
                    FM_FH_PNTR;
            }
        }
    }
    FM_CNTRL[M] = 1
    FM_CNTRL[S] = 0
}
```

While the FM_CTRL[S] bit is set to 1, the FMMU 438 may perform the following steps. For each entry in the FMMU 438, it may be checked whether the entry is a valid entry (i.e., the "entry.valid_bit" requirement for the guard of the if statement nested in the first for-loop) and whether said entry is used for (or, is used in the context of) the resources to be migrated from the source server 400 (i.e., the "entry.context_id==FM_SRC_MIRROR_ID" requirement for the guard of the if statement nested in the first for-loop). If both of these requirements are met, then the entry may be written to address in the FM_FH_PNTR register (i.e., the FH_STORAGE file handle for the mount point of the state storage portion 498 of NAS 492, as shown by the "write entry to FM_FH_PNTR" line of the above pseudo-code). Finally, for each address in the page of the entry that was determined to be valid and used for the resources to be migrated, the address and the contents of the address may be written to the address in the FM_FH_PNTR register (i.e., the FH_STORAGE file handle for the mount point of the state storage portion 498 of NAS 492, as shown by the "write (address, *address) to FM_FH_PNTR" line of the above pseudo-code), as indicated by the copy operation arrow 664 of FIG. 6B.

When all of the entries in the FMMU 438 table have been traversed in this way, the FM_CNTRL[M] bit may be set to 1 (or, a logic high value) and the FM_CNTRL[S] bit may be set to 0 (or, a logic low value). Writing the FM_CNTRL bits in this way may end the snapshot mode of step 606 and may commence the mirroring mode of step 608 (indicated by the mirroring command 666 of FIG. 6B). In the mirroring mode of the FMMU 438, changes to the FMMU associated with the entries related to the resources to be migrated from the source server 400 may be saved to the state storage portion 498 of the NAS 492. These changes may be saved to the location specified in the FM_FH_PNTR register (i.e., the FH_STORAGE file handle for the mount point of the state storage portion 498 of NAS 492), as indicated by the mirroring arrow 664.

The state changes that are mirrored in step 608 may include write accesses to pages controlled by the FMMU 438. State changes to the FMMU 438 may also include the effects of read misses. Read misses may cause a new entry to be created in the FMMU 438 table. This effectively modifies the FMMU 438 state even though the change was initiated by a read access. As stated above, these changes may be written to FM_FH_PNTR. Once in the mirror mode of step 608, the FMMU driver 426 may return true for the FmmuDriver::mirrorState( ) function call.

The state capture and mirroring operations from the source server 400 comprise two steps—(1) the capture and mirroring of the FMMU 438 states to the state storage portion 498 of the NAS 492 and (2) the capture and mirroring of the hardware accelerator configurations on the FPGA 436 of the source server 400. FIG. 6 relates to the capture and mirroring of the FMMU 438 states, whereas FIG. 8 relates to the capture and mirroring of the hardware accelerator configurations. Both of the method of FIGS. 6 and 8 may be performed simultaneously, but are explained separately for clarity of illustration.

Figure 7A:
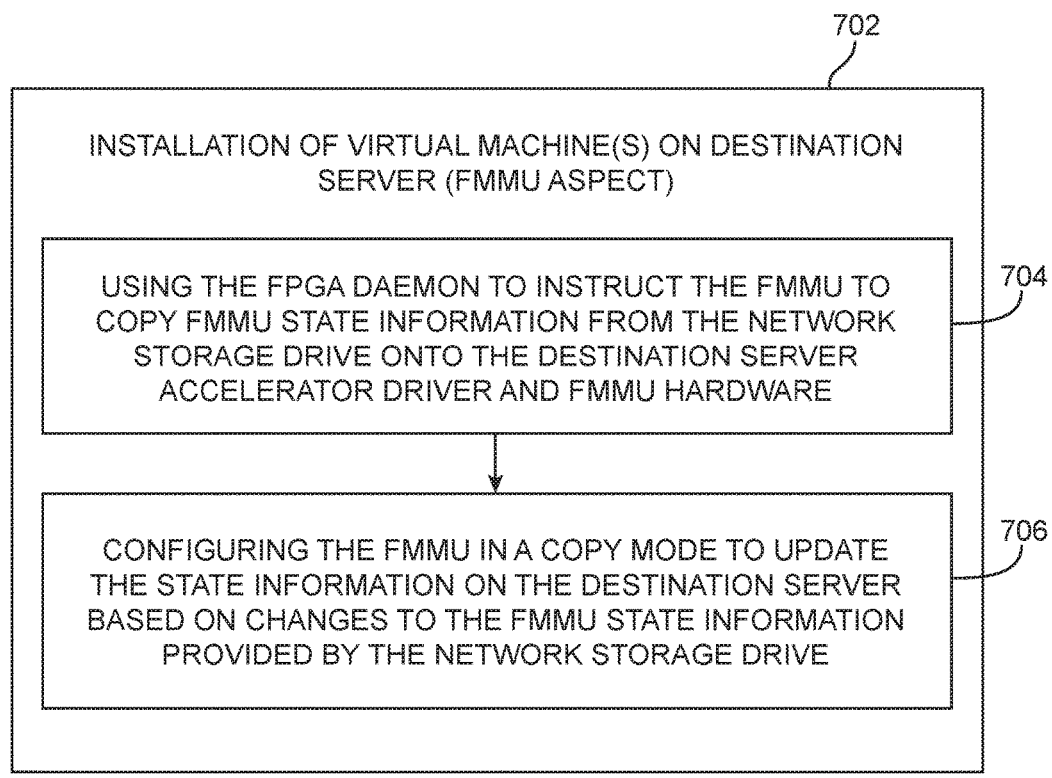
FIG. 7A is a flowchart of steps for the destination server to replicate the programmable circuitry memory management unit from the source server during live migration in accordance with an embodiment.
Figure 7B:
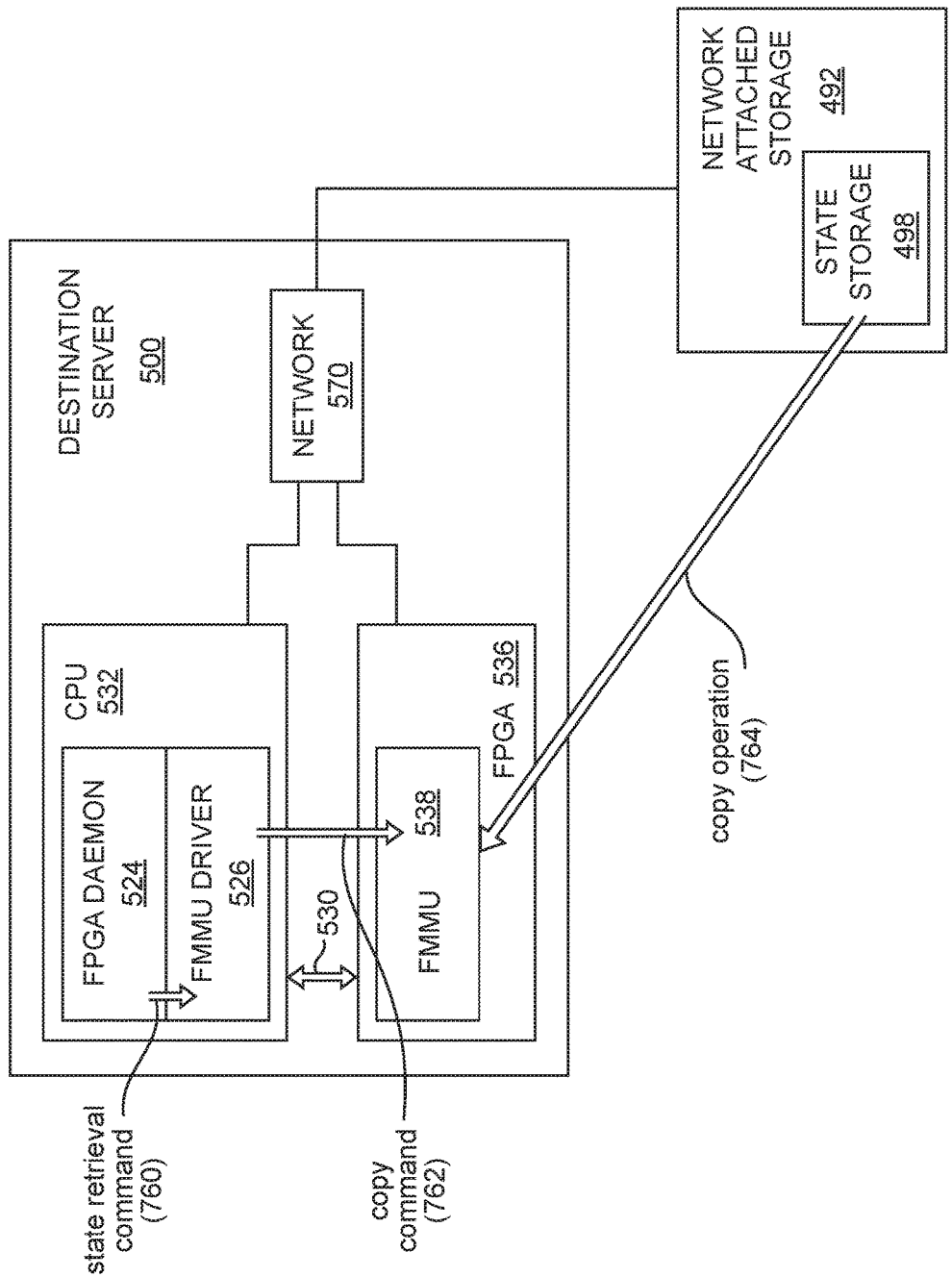
FIG. 7B is a diagram of the destination server and its communications during the replication of the programmable circuitry memory management unit from the source server during live migration in accordance with an embodiment.

In connection with the mirroring of the FMMU 438 states, FIG. 7A is a flowchart of steps for the destination server to replicate the programmable circuitry memory management unit from the source server during live migration in accordance with an embodiment. FIG. 7B is a diagram of the destination server and its communications during the replication of the programmable circuitry memory management unit from the source server during live migration in accordance with an embodiment.

At step 702, virtual machines may be installed the destination server 500 of FIG. 7B. At step 704, the FPGA daemon 524 on CPU 532 of destination server 500 may be used to issue a state retrieval command 760 to the FMMU driver 526. The state retrieval command 760 may be illustrated by the function call below:

bool   FmmuDriver::retrieveState(uid_t   dst_RSRC_0, FILE *FH_STORAGE)

The dst_RSRC_0 identifier may be the ID 562 of FIG. 5A in which the resources to be migrated from the source server 400 are specified. The FH_STORAGE address may point to the file mount for the state storage portion 498 of the NAS 492.

The state retrieval command 760 may involve the FMMU driver 526 issuing a copy command 762 to the FMMU 538 on the FPGA 536 over the switch interface 530. The FMMU driver 526 may do this by writing dst_RSRC_0 (i.e., the ID 562) to FMMU 538 register FM_DST_MIRROR_ID. The FMMU driver 526 may also write the address of FH_STORAGE to FMMU register FM_FH_PNTR. These register writes in the FMMU 538 by the FMMU driver 526 cause the FMMU 538 hardware to begin copying data from the location at FM_FH_PNTR to entries and pages within the FMMU 538.

Note that as entries are written into the FMMU 538, those associated with FM_DST_MIRROR_ID may remain inactive regardless of the state of the valid bit in the FMMU 538 entry. This avoids any recursive effects of writing state to the FMMU 538.

The copy command 762 received at the FMMU 538 may then result in a copy operation 764, in which the FMMU 438 states saved to the state storage portion 498 of NAS 492 (such as the states saved in step 606 of FIG. 6A by the source server 400) may be copied to the FMMU 538 in the destination server 500.

The FMMU 538 on the destination server 500 may then, at step 706, be configured in a copy mode to update its state information based on changes made to the state information of the source server 400's FMMU 438 that are updated on the state storage portion 498 of the NAS 492 (such as the state updates mirrored in step 608 of FIG. 6A). The copying of steps 704 and 706 may be illustrated by the copy operation 764 from the state storage portion 498 of NAS 492 to the FMMU 538. The steps of FIG. 7A may occur simultaneously with the steps of FIG. 6A, or in a partially overlapping interval as the interval in which the steps of FIG. 6A occur.

Figure 8A:
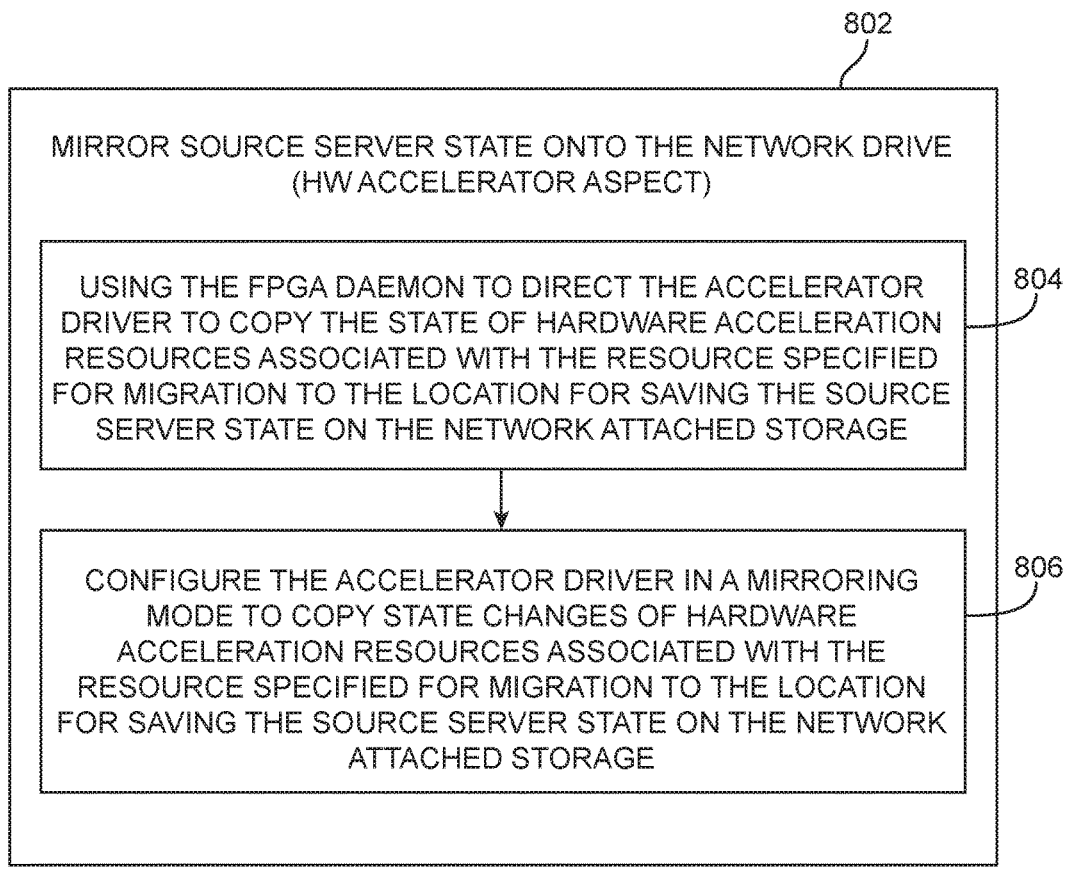
FIG. 8A is a flowchart of steps for the source server to mirror the state of hardware accelerator circuits during live migration in accordance with an embodiment.
Figure 8B:
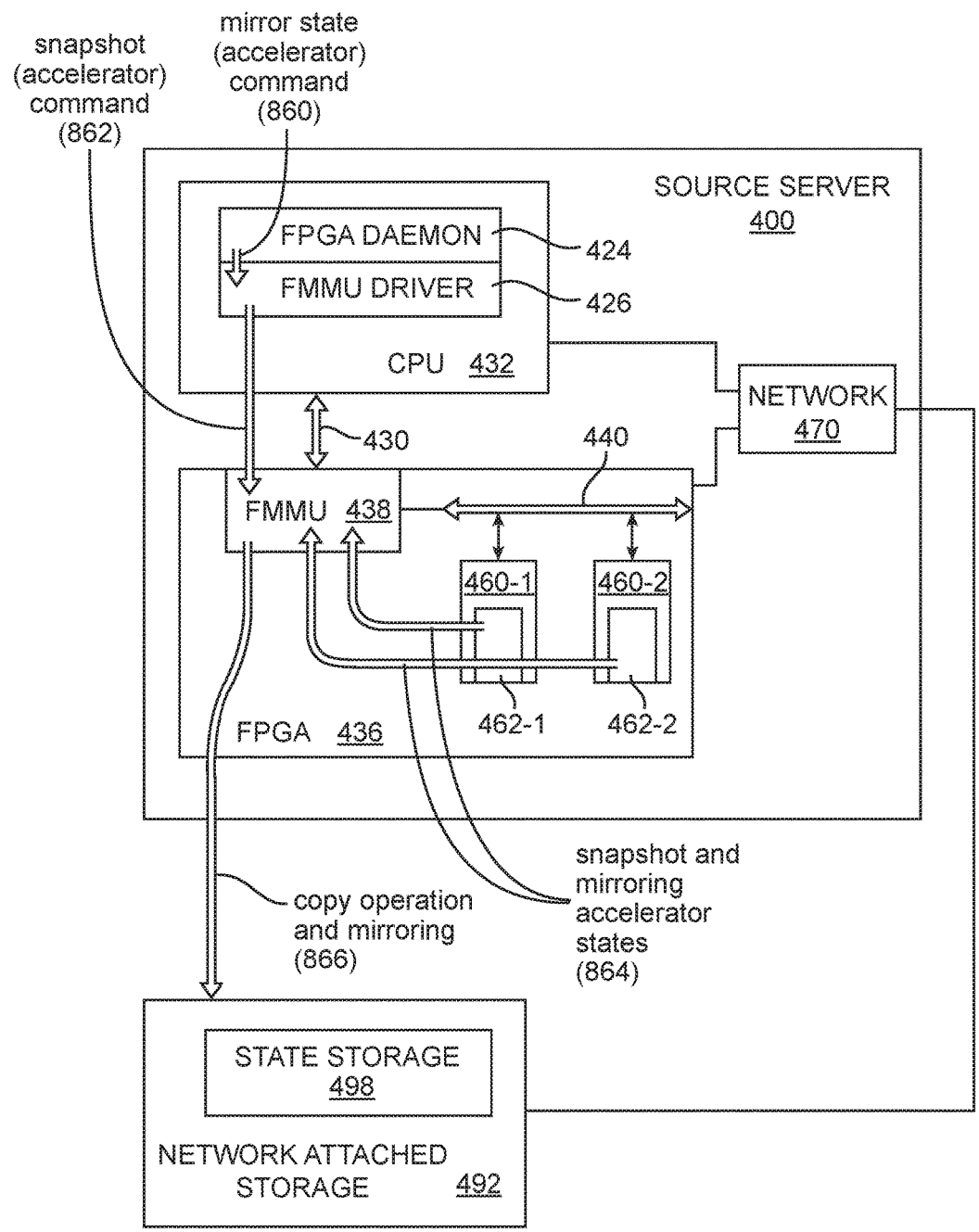
FIG. 8B is a diagram of the source server and its communications during the state mirroring of hardware accelerator circuits during live migration in accordance with an embodiment.

FIG. 8A is a flowchart of steps for the source server to mirror the state of hardware accelerator circuits during live migration in accordance with an embodiment. FIG. 8B is a diagram of the source server and its communications during the state mirroring of hardware accelerator circuits during live migration in accordance with an embodiment. As described above in connection with FIG. 6, while the steps of FIG. 8 are presented separately from the steps of FIG. 6, the steps of FIG. 8 may be performed simultaneously with the steps of FIG. 6.

At step 802, the hardware accelerator aspect of the source server 400 may be migrated mirrored onto the network drive 492. At step 804, the FPGA daemon 424 may direct the accelerator driver or the FMMU 438 to copy the state of the hardware accelerator resources 462 in slots 460 that are associated with the resources to be migrated onto the state storage portion 498 of the NAS 492. The FPGA daemon may first issue a mirror state command 860 to the FMMU driver 426 for the hardware accelerators. The mirroring command may be illustrated by the function call below:

bool AccelDriver::mirrorState(FILE*FH_STORAGE)

The FMMU driver 426 may then provide a snapshot command 862 to the FMMU 438, which results in the snapshot of the respective states of hardware accelerators 462 that are relevant to the resources to be migrated (in the present example, hardware accelerator resources 462-1 and 462-2) onto the FMMU 438 as shown by the copy operation 864. The FMMU 438 may then relate the snapshot of the respective states of the relevant hardware accelerators 462 to the state storage portion 498 (i.e., the location marked by the file handle FH_STORAGE) of the NAS 492. This transfer may be illustrated by the copy operation 866 from the FMMU 438 to the NAS 492.

At step 806, the accelerator driver or FMMU 438 may be configured in a mirroring mode to copy state changes of hardware acceleration resources associated with the resources specified to be migrated (such as the hardware accelerator resources 462-1 and 462-2, in the present example) to the state storage portion 498 of the NAS 492. Similar to the mirroring of post-snapshot changes in step 706 of FIG. 7A, in step 806, changes to the register states in the hardware accelerator resources 462 relevant to the resources to be migrated that occur after the copy operation of step 804 may be written to the state storage portion 498 of NAS 492. For hardware accelerators the mirroring function is similar to that of the FMMU but the implementation will be defined by the hardware accelerator implementation. For compatibility, the requirement for support of accelerator migration is the presence of a mirrorState( ) function call in the Driver.0 interface (described above in connection with the accelerator Y 576 in the resources 572 of the directory tree 596 on NAS 492).

Figure 9A:
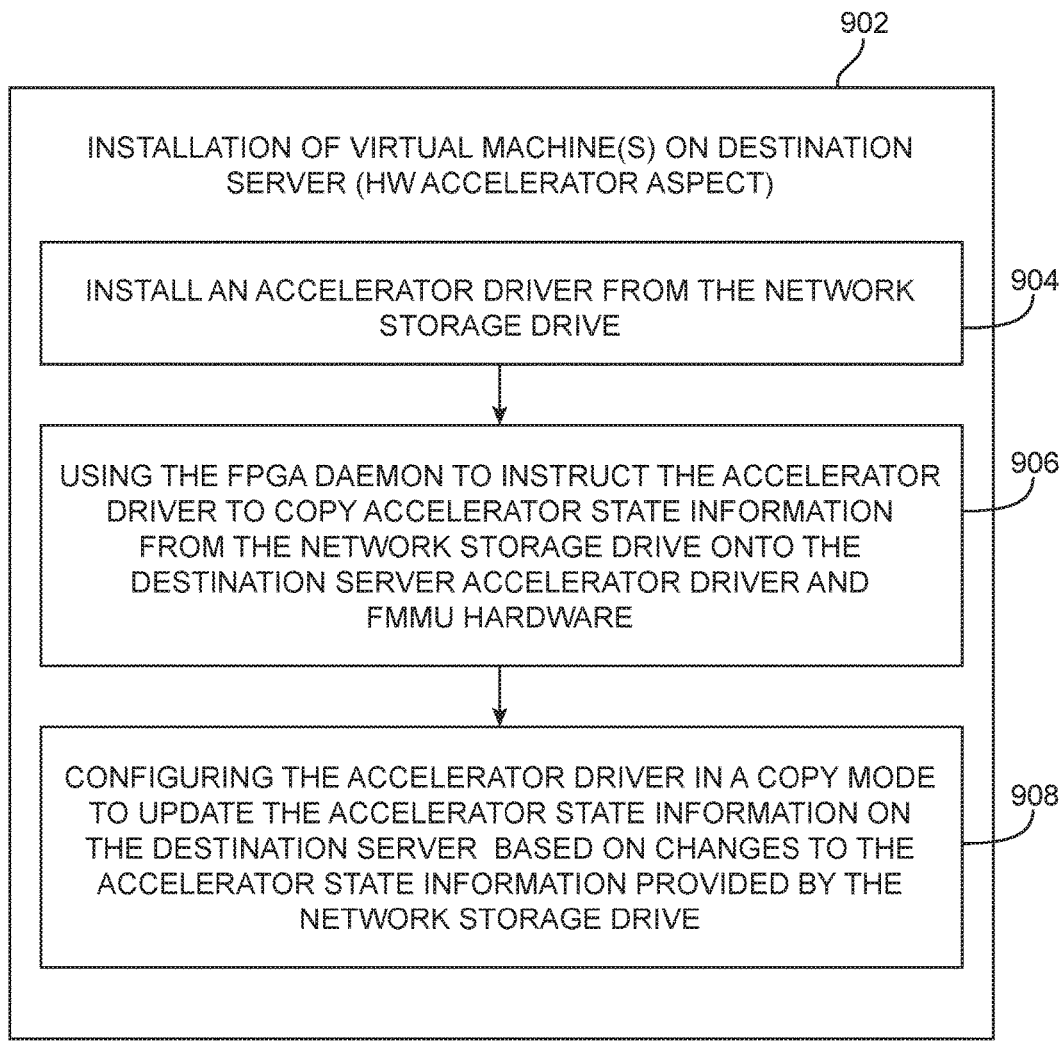
FIG. 9A is a flowchart of steps for the destination server to replicate the hardware accelerator circuits from the source server during live migration in accordance with an embodiment.
Figure 9B:
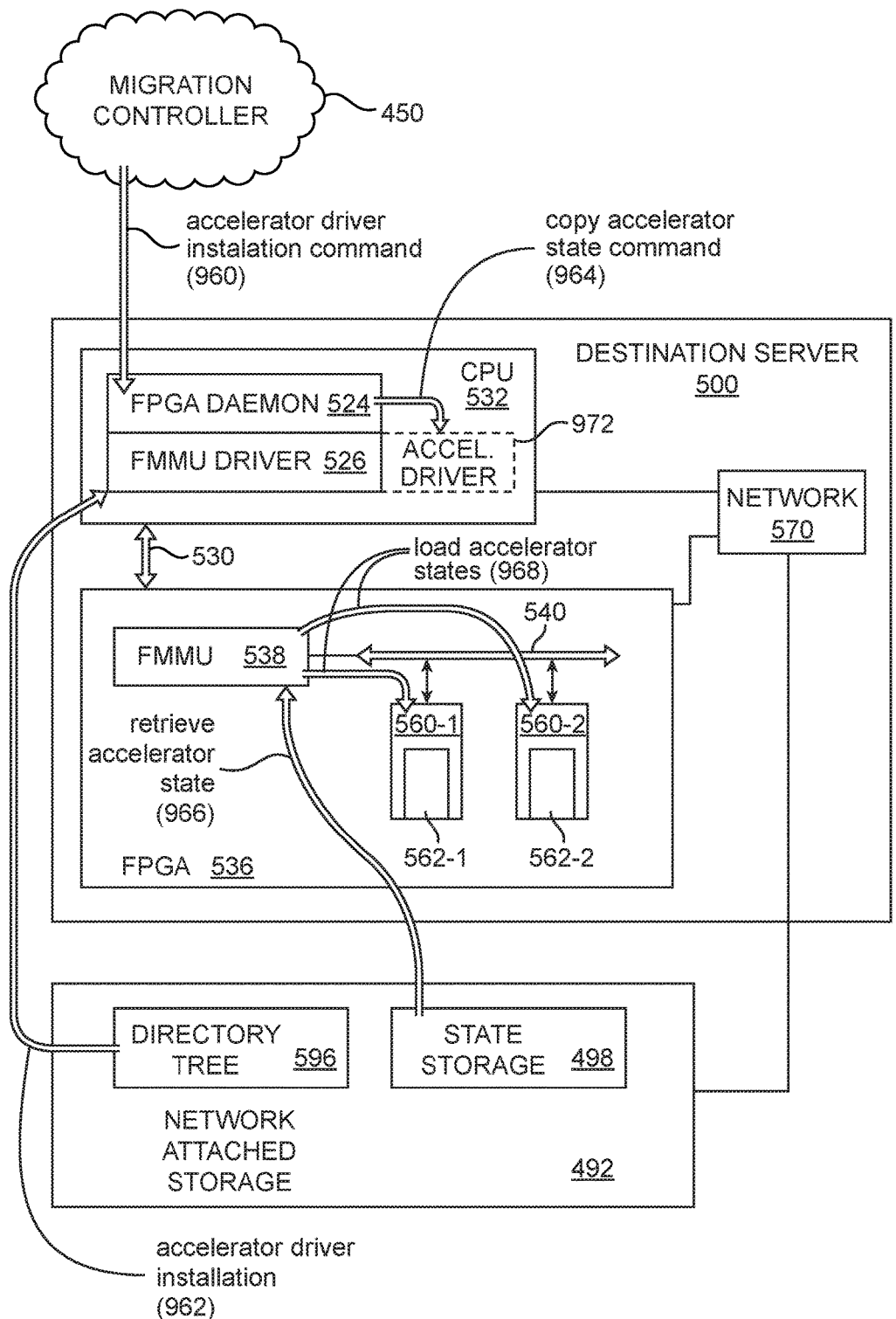
FIG. 9B is a diagram of the destination server and its communications during the replication of the hardware accelerator circuits from the source server during live migration in accordance with an embodiment.

FIG. 9A is a flowchart of steps for the destination server to replicate the hardware accelerator circuits from the source server during live migration in accordance with an embodiment. FIG. 9B is a diagram of the destination server and its communications during the replication of the hardware accelerator circuits from the source server during live migration in accordance with an embodiment.

As the methods of FIGS. 6 and 8 may be performed simultaneously or during overlapping intervals, the methods of FIGS. 7 and 9 may also be performed simultaneously or during overlapping intervals. The method of FIG. 9A may be performed at the same time or overlapping with the method of FIG. 8A. At step 902 of FIG. 9A, the hardware accelerator aspect of the source server 400 may be installed onto the destination server 500. The copy operations for the FMMU (i.e., the method of FIG. 7A) and hardware accelerator (i.e., the method of FIG. 9A) are similar with the difference that the destination server FMMU 538 is not in reset (during the copy operation of FIG. 7A) while the hardware accelerator on the destination server 500 is held in reset during the copy operation of FIG. 9A.

At step 904, an accelerator driver may be installed from the NAS 492, which may be represented with the below function call from the migration controller 450:

bool FPGAdaemon::migrationDstInstallApp(uid_t dst_RSRC_0)

This function call (i.e., the accelerator driver installation command 960) may cause FPGA daemon 524 to install the accelerator driver located at/system/mount/point/drivers (i.e., one of the folders of the directory 596 as described above) by calling the Linux process insmod( ), which relates to an install module, said Linux process function call may be illustrated below:

insmod/system/mount/point/drivers/Driver_0.ko

The installation that occurs after the acceleration command 960 may be represented by the accelerator driver installation operation 962.

Subsequent to the installation of the accelerator driver from the network storage drive 492 in step 904, FPGA daemon 524 may then notify the accelerator driver (shown in FIG. 9A as the driver 972 that is coupled to the FMMU driver 526) to begin copying state information from FH_STORAGE to the accelerator hardware by calling the following function in step 906, represented by the copy accelerator state command 964:

bool AccelDriver::retrieveState(FILE *FH_STORAGE)

The hardware accelerator driver 972 may write FH_STORAGE to a first hardware accelerator register HA_FH_PNTR and by setting a second hardware accelerator register EN_COPY to 1 or a logic high value in the accelerator such as the slots 560-1 and/or 560-2. As shown in FIG. 9B, a retrieve accelerator state command 966 may represent the hardware accelerator state information stored in the state storage portion 498 of NAS 492 (such as the hardware acceleration state information saved in step 804 of FIG. 8A) being provided to the FMMU 538, which is then loaded (operation 968) into the hardware accelerator slots 560-1 and 560-2 as the hardware accelerators 562-1 and 562-2, respectively as described by step 906.

In step 908, the accelerator driver 972 may be configured in a copy mode to update the respective states of the hardware accelerator resources 562 based on changes to the accelerator state information saved in the portion 498 of NAS 492. These changes may correspond to the changes saved in step 806 of FIG. 8A. Steps 806 and 908 may occur simultaneously or during overlapping intervals.

Figure 10:
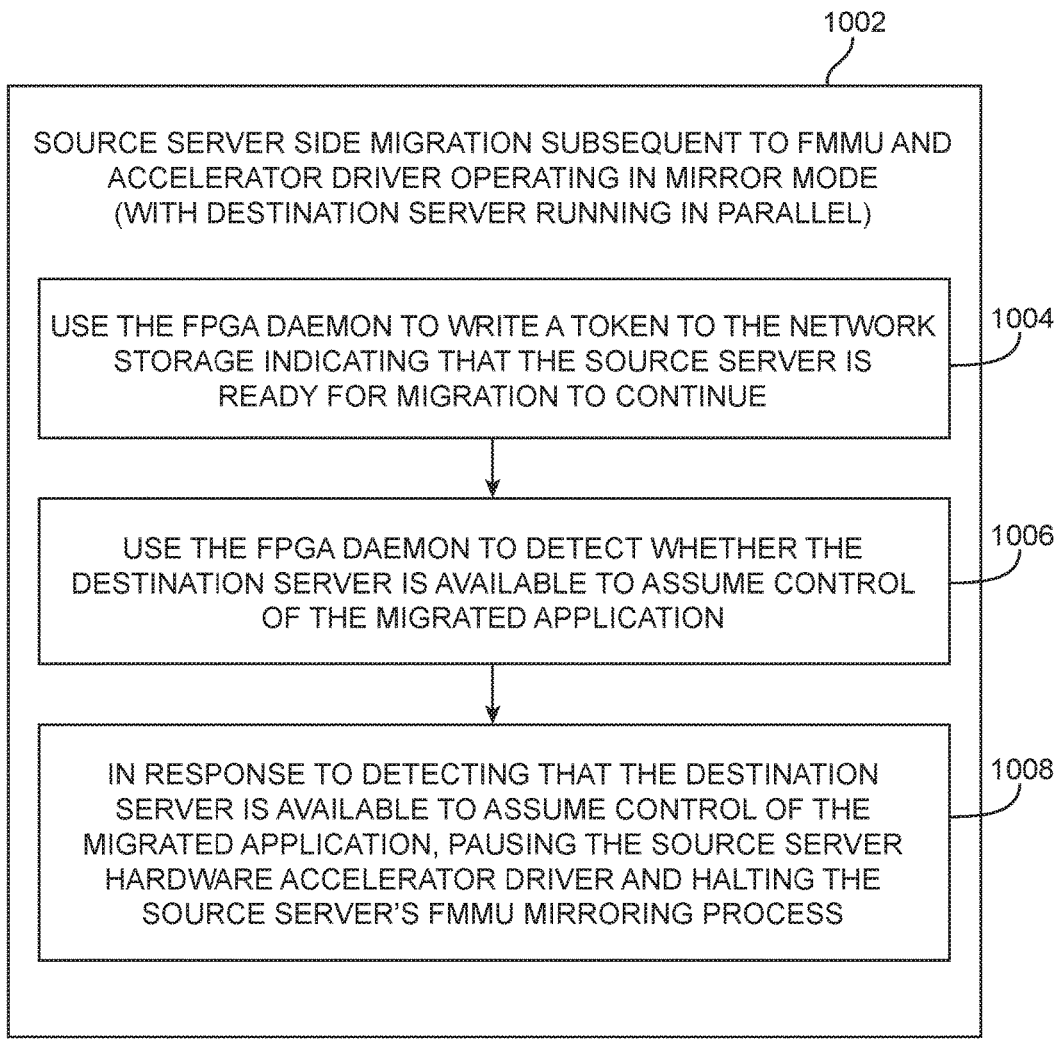
FIG. 10 is a flowchart of steps for the source server that are performed subsequent to the mirroring of the programmable circuitry memory management unit and the hardware accelerator circuits in accordance with an embodiment.

FIG. 10 is a flowchart of steps for the source server that are performed subsequent to the mirroring of the programmable circuitry memory management unit and the hardware accelerator circuits in accordance with an embodiment.

At step 1002, the source server side of the migration subsequent to the FMMU and accelerator drivers operating in the mirror mode (i.e., after the methods of FIGS. 6 and 8) may be described. The sub-steps of step 1002 may occur while the destination server is running the resources to be migrated in parallel. In step 1004, the FPGA daemon such as FPGA daemon 424 may be used to write a token to the NAS 492 indicating that the source server 400 is ready for migration of the relevant applications/resources to continue. An example of a function call provided to the FPGA daemon 424 to write said token (SrcAvail token) to the NFS_STORAGE location indicating the source server is ready for migration to continue may be illustrated below:

void FPGAdaemon::writeSrcAvailToken( )

At step 1006, the FPGA daemon 424 may then wait for the destination server 500 to write a destAvail token into the NFS_STORAGE mount point. This may be done by spawning a thread and executing (this could also be done without the thread but such an arrangement is not the preferred embodiment). Said waiting command may be illustrated by the below function call to the FPGA daemon 424:

void FPGAdaemon::waitForDestAvail(boost::fileystem:: path &p)

The argument "p" in the above function may be a path for the token. The waitForDestAvail function may return when the destAvail token from the destination server 500 is detected at the path p. When the destAvail token is provided at the path p on NAS 492, the FPGA daemon 424 may pause the hardware accelerator by executing the following at step 1008, in which the hardware accelerator and FMMU mirroring processes are paused/halted:

void AccelDriver::pauseAccel( )

The FPGA daemon 424 may halt the FMMU's mirror process by executing:

void FmmuDriver::haltMirror( )

Figure 11:
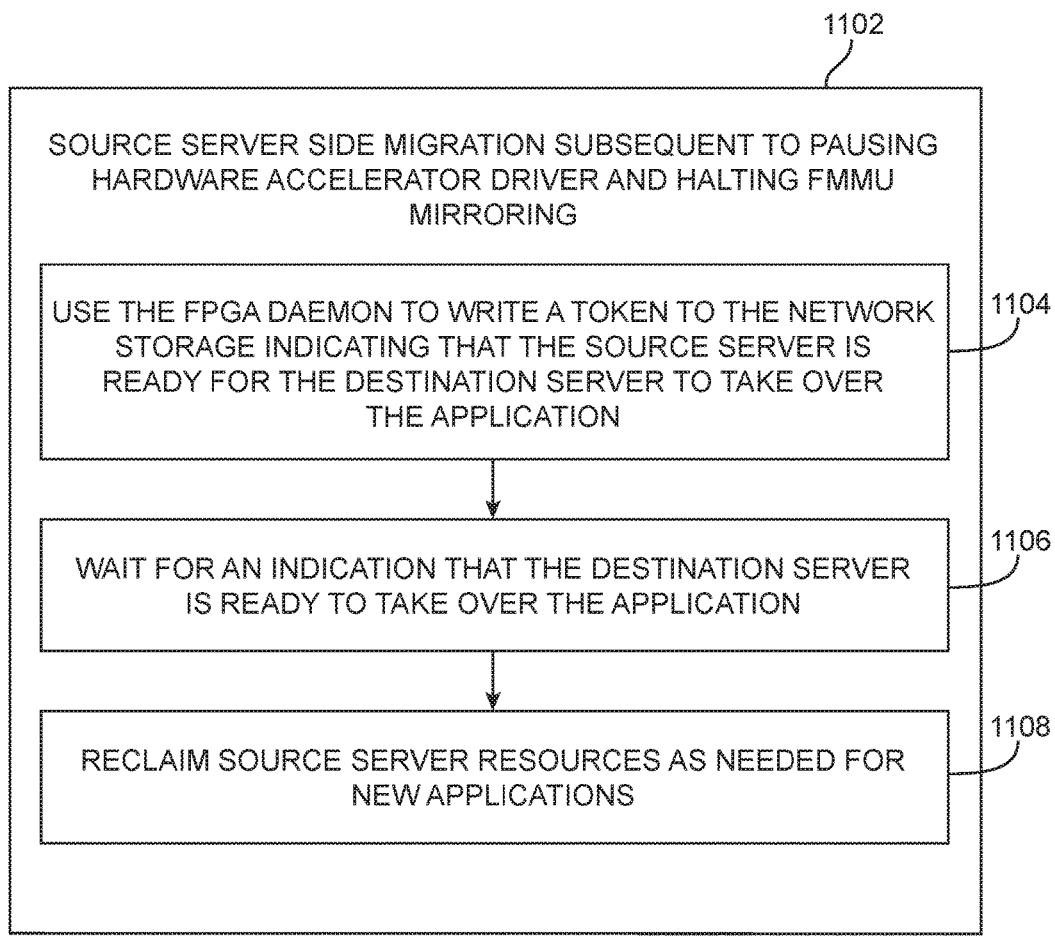
FIG. 11 is a flowchart of steps for the source server that are performed subsequent to pausing a hardware accelerator driver and halting the programmable circuitry memory management unit mirroring in accordance with an embodiment.

FIG. 11 is a flowchart of steps for the source server that are performed subsequent to pausing a hardware accelerator driver and halting the programmable circuitry memory management unit mirroring in accordance with an embodiment. In step 1102, the migration processes at the source server 400 subsequent to the halting pausing/halting of the hardware accelerator and FMMU mirroring are described. FPGA daemon 424 may write a token (the SrcReady token) to indicate that the source server is ready for the destination server to take over the application in step 1104:

void FPGAdaemon:writeSrcReadyToken( )

FPGA daemon 424 may then wait for the destination server to indicate it has control of the application by waiting for a DestReady token in step 1106, with the following function:

void waitForDestReady( )

On detection of the destReady token the FPGA daemon 424 may call the following function to recover server side resources as needed, in step 1108:

void Avfd::reclaimResources( )

Figure 12:
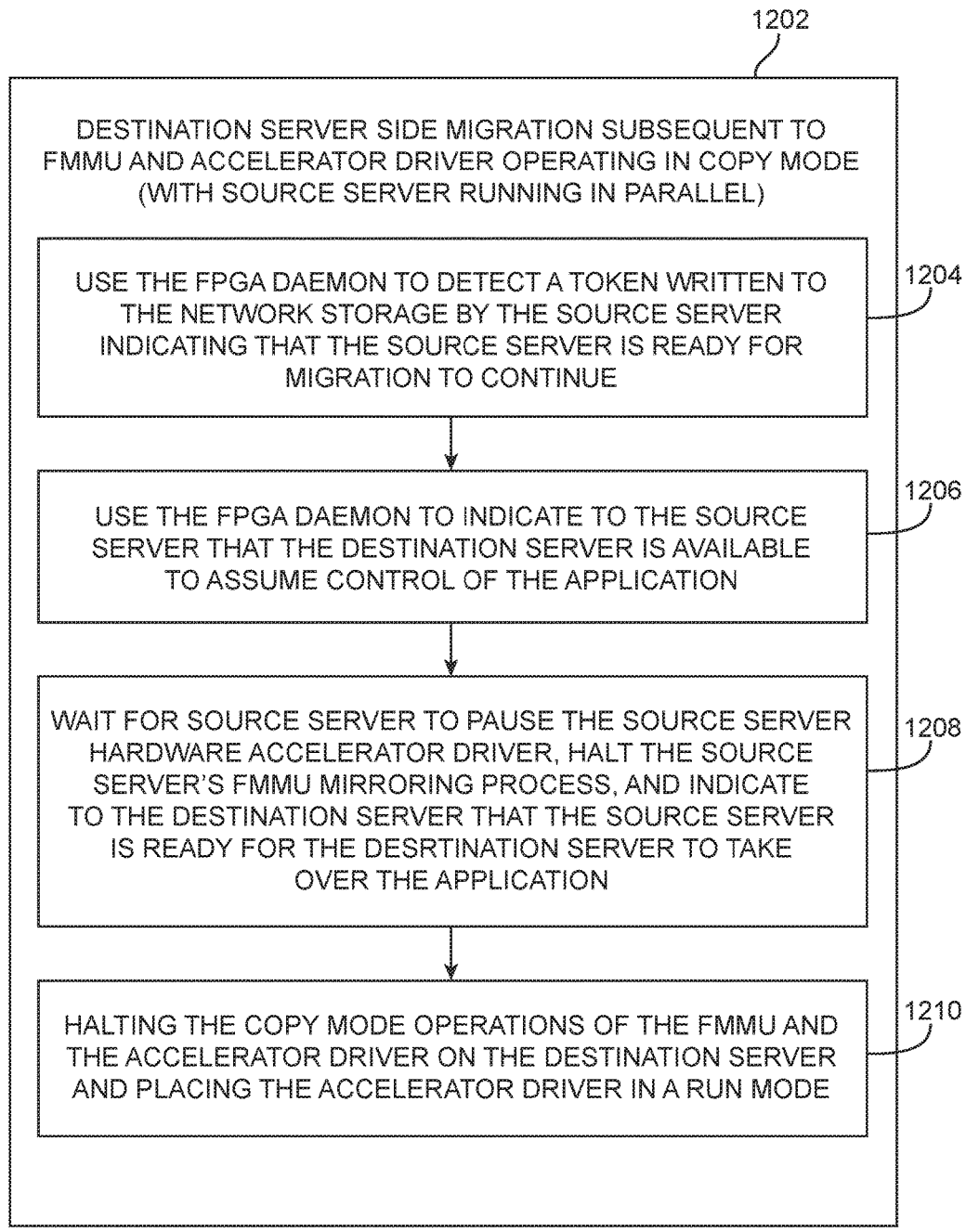
FIG. 12 is a flowchart of steps for the destination server that are performed subsequent to the replication of the programmable circuitry memory management unit and the hardware accelerator circuits in accordance with an embodiment.

FIG. 12 is a flowchart of steps for the destination server that are performed subsequent to the replication of the programmable circuitry memory management unit and the hardware accelerator circuits in accordance with an embodiment. The steps 1202 may describe the destination server 500 operations subsequent to the FMMU and accelerator driver operating in copy mode (i.e., subsequent to the methods of FIGS. 7 and 9). At the commencement of steps 1202, the source server 400 and the destination server 500 may be running the application to be migrated in parallel.

Once the FMMU and accelerator are in copy mode the FPGA daemon 524 on the destination server 500 may install and launches the application found in/system/mount/point/bin/App_0.exe of the directory tree 596 in NAS 492.

Upon launch of the application of directory tree 596, the hardware accelerator driver 972 may remain in copy mode. The FPGA daemon 524 may then wait (step 1204) for the presence of the srcAvail token which is written by the source server to the shared mount point at NFS_STORAGE (in step 1004 of FIG. 10) to the path p, as illustrated with the following illustrative function call:

void FPGAdaemon::waitForSrcAvailToken(file_path_t &p)

On detection/recognition of the srcAvail token in step 1204, the destination server may indicate its readiness to assume control of the application by writing the destAvail token in step 1206, which is illustrated by the following illustrative function call:

void FPGAdaemon::writeDestAvailToken(file_path_t &p)

Notably, this token is detected by the source server 400 during step 1006 of FIG. 10.

At step 1208, FPGA daemon 524 may then wait for the source server 400 to pause the server side application and complete all state copies. The source server indicates this by writing the srcReady token (as described in step 1104 of FIG. 11). FPGA daemon 524 may wait for this source token by calling:

void FPGAdaemon::waitForSrcReadyToken(file_path_t &p)

On receiving the source ready token, FPGA daemon 524 may halt the state copy processes of the accelerator and FMMU, and then moves the accelerator to the run state in step 1210, by the following illustrative function calls:

void FmmuDriver::haltCopy( )
    void AccelDriver::haltCopy( )
    void AccelDriver::run( )

Depending on the accelerator implementation the run( ) call may be implicit in the accelerator haltCopy( ) function call to the accelerator driver 972. FPGA daemon 524 may then send signals to the server side that it may begin reclaiming local resources by writing the destReady token that is detected in step 1106 of FIG. 11 and that may be illustrated with the following function call:

void avfd::writeDestRunningToken(file_path_t &p)

At this point, the migrated function is running. FPGA daemon 524 may notify the migration controller 450 of this fact and FPGA daemon 524 may perform local cleanup of temporary files and mount points used during the process, as illustrated by the following function call:

void Avfd::postMigrationCleanup( )

The migration operation described above may allow migration of a hardware accelerated application from a source server to a destination server with minimal interruption of the operation. Migration of a hardware accelerated application from a source server to a destination server may be possible without knowledge of the user space application component.

Shared temporary storage such as network attached storage units may be used to assist migration of a hardware accelerated application with improvements to interruption of the operation of the application. State changes in a running hardware accelerator and support infrastructure such as relevant entries of a configurable circuitry memory management unit may be mirrored to a resource such as remote storage shared by source and destination servers.

State changes of the running hardware accelerator and support infrastructure after a first snapshot may be mirrored to network attached storage using protocols such network file system (NFS) to hold state changes during the migration of the resources. Migration of FPGA based accelerators may be orchestrated or achieved migration controllers based on existing software defined data center or cloud services migration mechanisms.

Migration of an application may be coordinated without specific knowledge of the destination server or source server by the opposing server. Security may be improved due to use of trusted layers for all migration operations. Also, during the migration operations, there is no need to halt the operation of the user space application, and the migrated hardware consequently perceives little or no interruption in operation.

The live migration of the hardware accelerated application is reversible—should migration fail the original state of the source for the migration on a source server may be undisturbed.

What is claimed is:

1. A method of migrating a hardware accelerated application from a source server to a destination server, wherein the source server comprises a processor connected to an external migration controller and reconfigurable circuitry, wherein the reconfigurable circuitry includes a plurality of accelerator resource slots and a memory management unit for the accelerator resource slots, the method comprising:
    at the source server, receiving a migration notification from the migration controller, wherein the migration notification specifies a set of accelerator resource slots of the plurality of accelerator resource slots to be migrated and an identifier for the resources in the memory management unit to be migrated; wherein the migration controller is further configured for:
        saving an image of state information associated with the hardware accelerated application from the source server to network attached storage in response to receiving the migration notification;
        copying the image of state information associated with the hardware accelerated application from the network attached storage to the destination server; and
        running the hardware accelerated application in parallel on the source server and the destination server.

2. The method defined in claim 1, wherein saving the image of state information comprises:
    configuring memory management circuitry on the source server in a snapshot mode; and
    in response to configuring the memory management circuitry in the snapshot mode, copying entries in the memory management circuitry associated with the hardware accelerator resources used by the hardware accelerated application to the network attached storage.

3. The method defined in claim 2, further comprising:
    after saving the image of state information associated with the hardware accelerated application to the network attached storage, mirroring state changes at the source server to the network attached storage.

4. The method defined in claim 3, wherein mirroring the state changes at the source server comprises:
    configuring the memory management circuitry on the source server in a mirroring mode; and
    in response to configuring the memory management circuitry on the source server in the mirroring mode, updating the image of state information saved at on the network attached storage based on the state changes at the source server.

5. The method defined in claim 1,
    wherein the image of state information associated with the hardware accelerated application is saved to a location of the network attached storage specified in the migration notification.

6. The method defined in claim 1, further comprising:
    at the destination server, receiving a migration notification, wherein the image of state information associated with the hardware accelerated application is copied from a location of the network attached storage specified in the migration notification.

7. The method defined in claim 1, further comprising:
    performing a handshake operation with the source server and the destination server to transfer control of the hardware accelerated application to the destination server.

8. The method defined in claim 7, wherein performing the handshake operation comprises:
    using the source server to write a first token to the network attached storage indicating that the source server is ready for migration to continue;
    using the destination server to detect the first token at the network attached storage; and
    using the destination server to write a second token to the network attached storage indicating that the destination server is available to assume control of the application.

9. The method defined in claim 8, wherein performing the handshake operation further comprises:
    using the source server to detect the second token at the network attached storage; and
    in response to detecting the second token, halting state mirroring operations at the source server.

10. The method defined in claim 1, further comprising:
    using probe circuitry at the source server to measure quality of service metrics associated with the hardware accelerated application;
    monitoring the measured quality of service metrics for at least one migration condition; and
    in response to detecting the at least one migration condition, notifying network control services of the at least one migration condition.

11. The method defined in claim 1, wherein saving the image of state information associated with the hardware accelerated application comprises:

traversing a plurality of entries in the memory management unit for the accelerator resource slots and detecting which of the plurality of entries are associated with the identifier received in the migration notification; and
copying the entries associated with the identifier received in the migration notification to the network attached storage.

12. A method of migrating a hardware accelerated application from a source server, the source server comprising a processor coupled to memory-stored instructions, which when executed by the processor, implement virtualized instances of a daemon and migration process server code, the method comprising:
at a daemon on the source server, receiving a migration notification from a migration controller; wherein the migration process code is configured for:
saving a snapshot of state information associated with the hardware accelerated application from the source server to network attached storage in response to receiving the migration notification by configuring memory management circuitry associated with a plurality of hardware acceleration resources on the source server in a snapshot mode, wherein the snapshot of state information includes state values for selected hardware acceleration resources of the plurality of hardware acceleration resources specified in the migration notification;
mirroring state changes associated with the hardware accelerated application from the source server to the network attached storage by configuring the memory management circuitry in a mirroring mode, wherein the state values for the selected hardware acceleration resources specified in the migration notification are updated on the network attached storage in response to the memory management circuitry being configured in the mirroring mode; and
monitoring the network attached storage for a notification that another server is available to assume control of the hardware accelerated application.

13. The method defined in claim 12, further comprising:
mounting the network attached storage; and
saving the snapshot of state information associated with the hardware accelerated application from the source server to a location on the network attached storage specified in the migration notification.

14. The method defined in claim 13, wherein saving the snapshot of state information associated with the hardware accelerated application comprises:
using the daemon to configure memory management circuitry associated with programmable logic circuitry on the source server in a snapshot mode;
in the snapshot mode, searching a plurality of entries stored in the memory management circuitry for particular entries associated with an application identifier specified in the migration notification; and
writing the particular entries associated with the application identifier to the location on the network attached storage specified in the migration notification.

15. The method defined in claim 13, wherein saving the snapshot of state information associated with the hardware accelerated application comprises:
copying state information associated with hardware accelerator drivers to the location on the network attached storage specified in the migration notification.

16. A method for migrating a hardware accelerated application to a destination server, the destination server comprising a processor coupled to memory-stored instructions, which when executed by the processor, implement virtualized instances of a hypervisor and migration process server code, the method comprising:
at a hypervisor on the destination server, receiving a migration notification from a migration controller; where the migration process code is configured for:
copying a snapshot of state information associated with the hardware accelerated application from network attached storage to the destination server in response to receiving the migration notification;
updating the destination server with changes to the state information on the network attached storage by configuring memory management circuitry associated with hardware acceleration resources on the destination server to update state values for the hardware acceleration resources based on detected changes to the snapshot of state information on the network attached storage; and
writing a notification to the network attached storage indicating that the destination server is available to assume control of the hardware accelerated application.

17. The method defined in claim 16, further comprising:
mounting the network attached storage; and
retrieving the snapshot of state information associated with the hardware accelerated application from a location on the network attached storage specified in the migration notification.

18. The method defined in claim 17, wherein copying the snapshot of state information associated with the hardware accelerated application from network attached storage comprises:
using the hypervisor to configure the memory management circuitry associated with hardware accelerator resources on the destination server to load state values from the location on the network attached storage specified in the migration notification, and wherein updating the destination server with changes to the state information on the network attached storage comprises:
using the hypervisor to configure the memory management circuitry to update the state values based on changes to data at the location on the network attached storage specified in the migration notification.

19. The method defined in claim 17, wherein copying the snapshot of state information associated with the hardware accelerated application from network attached storage comprises:
installing a hardware accelerator driver from a directory location on the network attached storage specified in the migration notification; and
using the hypervisor to configure the accelerator driver to copy hardware accelerator state information from the location on the network attached storage specified in the migration notification.

* * * * *